(12) United States Patent
Wang

(10) Patent No.: US 11,607,679 B2
(45) Date of Patent: Mar. 21, 2023

(54) MATERIALS PLATED WITH PRECIOUS METALS AND MAKING AND USING SAME

(71) Applicant: THE JOHNS HOPKINS UNIVERSITY, Baltimore, MD (US)

(72) Inventor: Chao Wang, Ellicott City, MD (US)

(*) Notice: Subject to any disclaimer, the term of this patent is extended or adjusted under 35 U.S.C. 154(b) by 593 days.

(21) Appl. No.: 16/499,545

(22) PCT Filed: Apr. 2, 2018

(86) PCT No.: PCT/US2018/025714
§ 371 (c)(1),
(2) Date: Sep. 30, 2019

(87) PCT Pub. No.: WO2018/184013
PCT Pub. Date: Oct. 4, 2018

(65) Prior Publication Data
US 2020/0129973 A1    Apr. 30, 2020

Related U.S. Application Data

(60) Provisional application No. 62/479,881, filed on Mar. 31, 2017.

(51) Int. Cl.
*H01M 4/92* (2006.01)
*B01J 35/00* (2006.01)
(Continued)

(52) U.S. Cl.
CPC ......... *B01J 35/008* (2013.01); *B01J 23/8913* (2013.01); *B01J 35/006* (2013.01);
(Continued)

(58) Field of Classification Search
CPC .... B01J 23/89; B01J 23/8913; B01J 35/0013; B01J 35/002; B01J 35/0033; B01J 35/006;
(Continued)

(56) References Cited

U.S. PATENT DOCUMENTS 8,227,372 B2   7/2012  Lopez et al.
2006/0135359 A1  6/2006  Adzic et al.
(Continued)

FOREIGN PATENT DOCUMENTS

CN    103537299 A  *  1/2014  ............. Y02E 60/50
CN    103537299 A      1/2014
(Continued)

OTHER PUBLICATIONS

Wang et al. Plating Precious Metals on Nonprecious Metal Nanoparticles for Sustainable Electrocatalysts. Nano Letters., (2017), 17 (6), pp. 3391-3395.
(Continued)

*Primary Examiner* — Victoria H Lynch

(57) ABSTRACT

Core-shell nanoparticles having a solid core comprising a first metal and a shell comprising a second metal disposed at least a portion of the exterior surface of the core. The core-shell nanoparticles comprise a non-precious transition metal and the second metal comprises a precious metal or semi-precious metal. The core-shell nanoparticles can be used to catalyze oxygen reduction reactions. Also provided are compositions comprising the core-shell nanoparticles, methods of making same, and devices of same.

44 Claims, 14 Drawing Sheets

(51) Int. Cl.

| | |
|---|---|
| *B01J 23/89* | (2006.01) |
| *B01J 37/34* | (2006.01) |
| *C25B 11/04* | (2021.01) |
| *B82Y 30/00* | (2011.01) |
| *B82Y 40/00* | (2011.01) |
| *H01M 4/86* | (2006.01) |
| *H01M 8/10* | (2016.01) |

(52) U.S. Cl.
CPC ......... *B01J 35/0033* (2013.01); *B01J 37/348* (2013.01); *C25B 11/04* (2013.01); *H01M 4/921* (2013.01); *H01M 4/925* (2013.01); *B82Y 30/00* (2013.01); *B82Y 40/00* (2013.01); *H01M 4/8668* (2013.01); *H01M 2004/8689* (2013.01); *H01M 2008/1095* (2013.01)

(58) Field of Classification Search
CPC ....... B01J 35/008; B01J 37/348; B82Y 30/00; B82Y 40/00; C25B 11/04; C25B 1/04; H01M 2004/8689; H01M 2008/1095; H01M 4/8668; H01M 4/921; H01M 4/925; Y02E 60/36; Y02E 60/50
See application file for complete search history.

(56) References Cited

U.S. PATENT DOCUMENTS

| | | |
|---|---|---|
| 2006/0177660 A1 | 8/2006 | Kumar et al. |
| 2010/0197490 A1 | 8/2010 | Adzic et al. |
| 2011/0200915 A1 | 8/2011 | Goto et al. |
| 2011/0245068 A1 | 10/2011 | Stamenkovic et al. |

FOREIGN PATENT DOCUMENTS

| | | |
|---|---|---|
| JP | 2013215697 A | 10/2013 |
| KR | 201300963264 A | 8/2013 |

OTHER PUBLICATIONS

Lv et al. Recent advances in the design of tailored nanomaterials for efficient oxygen reduction reaction., Nano Energy., (2016), 29, pp. 149-165.

Park et al. Synthesis of "Solid Solution" and "Core-Shell" Type Cobalt-Platinum Magnetic Nanoparticles via Transmetalation Reactions., J. Am. Chem Soc., (2001), 123 (24), pp. 5743-5746.

Van Der Vliet et al. Unique electrochemical adsorption properties of Pt-skin surfaces. Angew Chem Int Edit., (2012), 51 (13), pp. 3139-3142.

Perdew et al. Generalized Gradient Approximation Made Simple. Phys. Rev. Lett., (1996), 77 (18), pp. 3865-3868.

Stamenkovic et al. Effect of surface composition on electronic structure, stability, and electrocatalytic properties of Pt-transition metal alloys: Pt-skin versus Pt-skeleton surfaces. J. Am. Chem. Soc., (2006), 128 (27), pp. 8813-8819.

Peng et al. Synthesis and stabilization of monodisperse Fe nanoparticles. J. Am. Chem. Soc., (2006), 128 (33), pp. 10676-10677.

Wu et al. Stable Cobalt Nanoparticles and Their Monolayer Array as an Efficient Electrocatalyst for Oxygen Evolution Reaction. J. Am. Chem. Soc., (2015), 137 (22), pp. 7071-7074.

Zhang et al. Synthesis and oxygen reduction activity of shape-controlled Pt(3)Ni nanopolyhedra. Nano Lett., (2010), 10 (2), pp. 638-644.

Wu et al. Shape and composition-controlled platinum alloy nanocrystals using carbon monoxide as reducing agent Nano Lett., (2011), 11 (2), pp. 798-802.

Zhou et al. Highly uniform platinum icosahedra made by hot injection-assisted GRAILS method. Nano Lett., (2013), 13 (6), pp. 2870-2874.

Kang et al. Shape-controlled synthesis of Pt nanocrystals: the role of metal carbonyls. ACS Nano. (2013), 7 (1), pp. 645-653.

Toyoshima et al. Heats of Chemisorption of O2, H2, CO, CO2, and N2 on Polycrystalline and Single Crystal Transition Metal Surfaces. Catal. Rev., (1979), 19 (1), pp. 105-159.

Xia et al. 25th anniversary article: galvanic replacement: a simple and versatile route to hollow nanostructures with tunable and well-controlled properties. Adv. Mater., (2013), 25 (44), pp. 6313 6333.

Lu et al. Mechanistic studies on the galvanic replacement reaction between multiply twinned particles of Ag and HAuCl4 in an organic medium. J Am. Chem. Soc., (2007), 129 (6), pp. 1733-1742.

Norskov et al. Origin of the Overpotential for Oxygen Reduction at a Fuel-Cell Cathode. J. Phys. Chem. B., (2004), 108 (46), pp. 17886-17892.

Stamenkovic et al. Improved oxygen reduction activity on Pt3Ni(111) via increased surface site availability. Science., (2007), 315 (5811), pp. 493-497.

Cui et al. Compositional segregation in shaped Pt alloy nanoparticles and their structural behaviour during electrocatalysis. Nature Mater., (2013), 12 (8), pp. 765-771.

Li et al. Functional links between Pt single crystal morphology and nanoparticles with different size and shape: the oxygen reduction reaction case. Energ. Environ. Sci., (2014), 7, pp. 4061-4069.

Greeley et al. Alloys of platinum and early transition metals as oxygen reduction electrocatalysts. Nature Chem., (2009), 1 (7), pp. 552-556.

Zeng et al. In situ measurement of lithiation-induced stress in silicon nanoparticles using micro-Raman spectroscopy. J. Nano Energy., (2016), 22, pp. 105-110.

\* cited by examiner

MATERIALS PLATED WITH PRECIOUS METALS AND MAKING AND USING SAME

CROSS-REFERENCE TO RELATED APPLICATIONS

This application is a 35 U.S.C. § 371 U.S. national entry of International Application PCT/US2018/025714, having an international filing date of Apr. 2, 2018, which claims the benefit of U.S. Provisional Application No. 62/479,881, filed Mar. 31, 2017, the content of each of the aforementioned applications is herein incorporated by reference in their entirety.

STATEMENT REGARDING FEDERALLY SPONSORED RESEARCH

This invention was made with government support under contract no. DMR-1410175 awarded by the National Science Foundation. The government has certain rights in the invention.

FIELD OF THE DISCLOSURE

The disclosure generally relates to core-shell nanoparticles where the core comprises a non-precious metal and the shell comprises a precious metal. More particularly the disclosure generally relates to using the core-shell nanoparticles as catalysts.

BACKGROUND OF THE DISCLOSURE

Precious metals play an important role in modern industry, with broad applications in electronics, optics and catalysis. The recent development of renewable energy technologies enabled by electrochemical energy conversion and storage, such as water electrolyzers, fuel cells and metal-air batteries, has further led to growing demands for precious metals, in particular platinum (Pt) for electrocatalytic applications. The availability of these critical materials is, however, limited due to the low abundance of the precious elements on earth, which represents a grand challenge for sustainability. Significant effort has thus been dedicated to improve the efficiency of using precious metals or develop their earth-abundant substitutes in various applications.

Plating has long been studied for decoration and modification of metal surfaces, probably originating from ancient Egypt where it was used to give copper a gold or silver finish. Plating in the nanoscale, e.g., coating a nonprecious metal (NPM) nanoparticle with a precious metal (PM) shell, is highly desirable for the development of cost-effective nanomaterials for catalytic and other applications. The formation of NPM/PM core-shell nanostructures may not only increase the specific surface areas in terms of precious metals, but also take advantage of the interactions between the two metals to enhance the catalytic activity (e.g., via ligand and/or strain effects). It is noticed that core-shell catalysts have been extensively studied in the literature, but mostly limited to those with both the core and shell consisting of precious metals. Growth of NPM/PM core-shell nanoparticles has largely remained challenging, with one of the primary obstacles being that the surface of NPM nanoparticles is prone to oxidation and the formed oxides may hinder the overgrowth of precious metals.

SUMMARY OF THE DISCLOSURE

In an aspect, the present disclosure provides methods of making core-shell nanoparticles. The methods are based on deposition (e.g., plating) of a precious metal or an alloy thereof on a non-precious transition metal where the deposition forms a shell on at least a portion of or all of a nanoparticle comprising the non-precious metal. In an example, the method provides solid core-shell nanoparticles.

In an example, a method for forming Co@Pt nanoparticles comprises plating cobalt (Co) nanoparticles with platinum (Pt). In an example, plating occurs through overgrowth of Pt on Co seeds. The Co nanoparticles (also referred to as "Co seeds") are prepared by thermal decomposition of an inorganic cobalt compound (e.g., cobalt carbonyl) in a solvent (e.g., an organic solvent) to form a reaction mixture. An inorganic platinum compound (e.g., platinum acetylacetonate) is added to the reaction mixture and allowed to overgrow on the seeds. Not intending to be bound by any particular theory, it is believed that carbon monoxide (CO) enables Pt plating on Co.

In an aspect, the present disclosure provides core-shell nanoparticles. The core-shell nanoparticles can be denoted core metal(s)@shell metal(s). The core is made of (e.g., comprises, consists essentially of, or consists of) non-precious metal (e.g., cobalt). The shell is made of (e.g., comprises, consists essentially of, or consists of) precious metal(s) and/or semi-precious metal(s).

In various examples, a core-shell nanoparticle (e.g., having a solid core) comprises a non-precious metal (e.g., a first metal (e.g., a non-precious transition metal such as, for example, cobalt)) and a shell comprising one or more precious metal and/or semi-precious metal (e.g., second metal (e.g., a precious metal such as, for example, platinum, palladium and/or semi-precious metal such as, for example, iridium, rhodium, ruthenium)) disposed on at least portion of an exterior surface or all of the exterior surface of the core.

In an aspect, the present disclosure provides compositions. The compositions comprise one or more core-shell nanoparticles of the present disclosure. The core-shell nanoparticles can be disposed on a substrate and/or disposed in a material.

In an aspect, the present disclosure provides methods of using core-shell nanoparticles of the present disclosure. In various examples, core-shell nanoparticles of the present disclosure are used as catalysts (e.g., as electrocatalysts).

In various examples, a method of catalyzing an oxygen reduction reaction comprises: contacting an electrode (e.g., a cathode) comprising one or more nanoparticles of the present disclosure or a composition of the present disclosure disposed on at least a portion of an exterior surface of the electrode that is in contact with an electrolyte (e.g., an alkaline or acidic medium (e.g., aqueous medium)) with oxygen (e.g., that is present in the alkaline or acidic medium), and providing or applying a current to the electrode, such that anionic oxygen species and/or oxygen species (e.g., $H_2O$, $OH^-$, $O^{2-}$, and combinations thereof) are formed by one or more oxygen reduction reaction. In various examples, the electrode is a cathode of an electrochemical cell, electrolyzer, or fuel cell (e.g., a polymer electrolyte membrane fuel cell).

In an aspect, the present disclosure provides devices. The devices comprise core-shell nanoparticles of the present disclosure.

In various examples, a device comprises one or more electrode (e.g., one or more cathode) that comprises one or more nanoparticles of the present disclosure or a composition of the present disclosure. The nanoparticles or composition can be disposed on at least a portion or all of an exterior surface of the electrode, which may be in contact with an electrolyte, if present.

Examples of devices include, but are not limited to, electrochemical cells, electrolyzers, and fuel cells. The electrode is an electrode (e.g., cathode) of the electrochemical cell, electrolyzer or fuel cell (e.g., a polymer electrolyte membrane fuel cell).

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
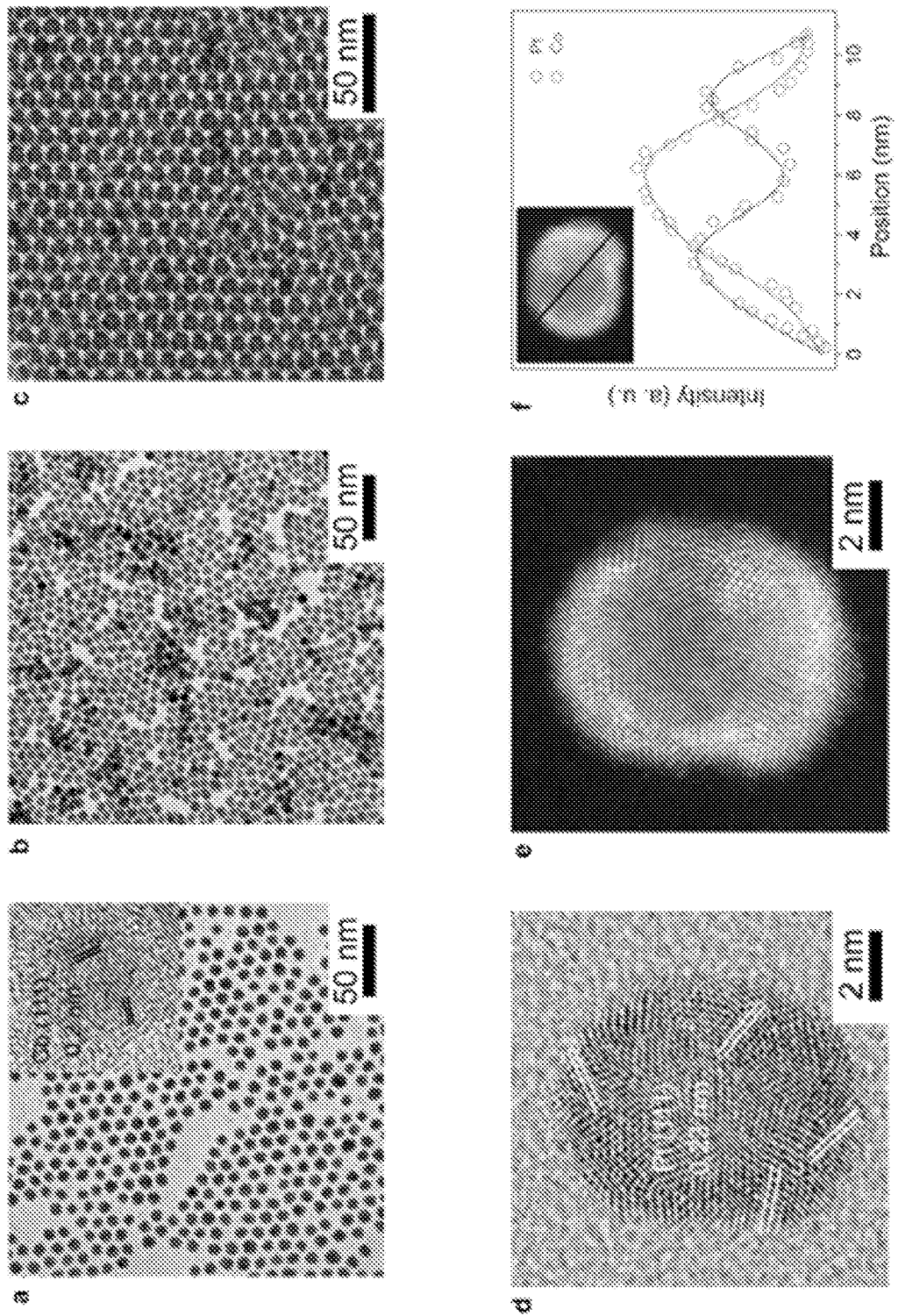
FIG. 1 shows a synthesis of Co@Pt nanoparticles. (a) transmission electron microscopy (TEM) and (high-resolution transmission electron microscopy) HRTEM (inset) images of Co seeds. (b, c) Representative TEM, (d) bright- and (e) dark-field (scanning transmission electron microscopy) STEM images of the obtained Co@Pt nanoparticles. (f) Elemental line profiles across a single Co@Pt nanoparticle.

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

In an aspect, the present disclosure provides methods of making core-shell nanoparticles. The methods are based on deposition (e.g., plating) of a precious metal or an alloy thereof on a non-precious transition metal where the deposition forms a shell on at least a portion of or all of a nanoparticle comprising the non-precious metal. In an example, the method provides solid core-shell nanoparticles.

In an example, a method uses in situ seed mediated growth, where carbon monoxide (CO) acts as both a stabilizing agent and a reducing agent. In an example, there is no exogenous carbon monoxide used in the method.

In an example, a method for forming Co@Pt nanoparticles comprises plating cobalt (Co) nanoparticles with platinum (Pt). In an example, plating occurs through overgrowth of Pt on Co seeds. The Co nanoparticles (also referred to as "Co seeds") are prepared by thermal decomposition of an inorganic cobalt compound (e.g., cobalt carbonyl) in a solvent (e.g., an organic solvent) to form a reaction mixture. An inorganic platinum compound (e.g., platinum acetylacetonate) is added to the reaction mixture and allowed to overgrow on the seeds. Not intending to be bound by any particular theory, it is believed that carbon monoxide (CO) enables Pt plating on Co.

In an example, CO is introduced into the reaction mixture by decomposition of a metal carbonyl compound (e.g., cobalt carbonyl). In another example, CO is introduced into the process by flowing CO directly into the reaction mixture.

The method for forming core-shell nanoparticles yields nanoparticles having a range of diameter sizes and a thickness range for their uniform shell thickness. In an embodiment, the core-shell nanoparticles have a diameter ranging from 7-12 nm, and a uniform shell thickness of 0.5-2 nm.

In various examples, a method of making core-shell nanoparticles of the present disclosure comprises: a) providing a non-precious metal precursor (e.g., first metal precursor) compound comprising one or more carbonyl ligand (e.g., a transition metal carbonyl compound such as, for example, cobalt carbonyl) in a solvent (e.g., organic solvents such as for example, dichlorobenzene) to form a reaction mixture; b) heating the reaction mixture (e.g., to 140-180° C., including all integer ° C. values and ranges therebetween) from a), wherein nanoparticles comprising a non-precious metal (e.g., first metal) are formed; c) adding one or more precious metal and/or semi-precious metal precursor compounds (e.g., a second metal precursor compound (e.g., a precious metal or semi-precious metal coordination compound or organometallic compound such as, for example, an acetylacetonate (e.g., platinum acetylacetonate)) to the reaction mixture from b) (e.g., at a temperature of 140-180° C., including all integer ° C. values and ranges therebeteween), wherein a shell comprising a precious metal (e.g., a second metal) is formed on the nanoparticles comprising a non-precious metal (e.g., the first metal) are formed. The one or more precious metal and/or semi-precious metal precursor compounds can be added together or sequentially.

The precious metal or semi-precious metal precursor (e.g., second metal precursor) can be dissolved in a solvent (e.g., an organic solvent such as, for example, oleylamine or dichorobenzene). Combinations of different precious metal precursors (e.g., different metals and/or comprising different ligands) can be used. Different precious metal precursors can be added together or sequentially. Various concentrations of precious metal precursors can be used. For example, the concentration range of precious metal precursor(s) is/are 0.01 g/ml to 0.5 g/ml, including all 0.01 g/ml values and ranges therebetween.

In an aspect, the present disclosure provides core-shell nanoparticles. The core-shell nanoparticles can be denoted core metal(s)@shell metal(s). The core is made of (e.g., comprises, consists essentially of, or consists of) non-precious metal (e.g., cobalt). The shell is made of (e.g., comprises, consists essentially of, or consists of) precious metal (s) and/or semi-precious metal(s).

In various examples, a core-shell nanoparticle (e.g., having a solid core) comprises a non-precious metal (e.g., a first metal (e.g., a non-precious transition metal such as, for example, cobalt)) and a shell comprising one or more precious metal and/or semi-precious metal (e.g., second metal (e.g., a precious metal such as, for example, platinum, palladium and/or semi-precious metal such as, for example, iridium, rhodium, ruthenium)) disposed on at least portion of an exterior surface or all of the exterior surface of the core.

A shell can be an alloy. In an example, the alloy comprises one or more precious metal and, optionally, one or more non-precious metal. In various examples, the shell further comprises a third metal. Examples of alloy shells include, but are not limited to shells comprising platinum-nickel, platinum-iron, palladium-nickel, palladium-iron, platinum-palladium, or platinum-palladium-nickel alloys.

A core-shell nanoparticle can have various dimensions. In various examples, the core-shell nanoparticle has a longest dimension (e.g., diameter) of 7 nm to 12 nm, including all 0.1 nm values and ranges therebetween, (e.g., 7, 8, 9, 10, 11, or 12 nm). In various examples, the core of the core-shell nanoparticle has a longest dimension (e.g., diameter) of 3 nm to 10 nm, including all 0.1 nm values and ranges therebetween, (e.g., 3, 4, 5, 6, 7, 8, 9, or 10 nm). In various examples, the core-shell nanoparticle has a shell thickness (e.g., a uniform shell thickness) of 0.5 nm to 2 nm, including all, including all 0.1 nm values and ranges therebetween, (e.g., 0.5, 1, 1.5, and 2 nm).

A core and/or a shell of the core-shell nanoparticle can have various morphologies. In various examples, a core and/or a shell of the core-shell nanoparticle is spherical or substantially spherical (e.g., pseudospherical).

A core and/or shell of a core-shell nanoparticle can have various secondary structures. In various examples, the core is polycrystalline (e.g., having disordered polycrystalline domains) and/or the shell is polycrystalline (e.g., where a majority of the surfaces are (111) surfaces. In an example, the core Co nanoparticles are polycrystalline in nature. These nanoparticles can be highly disordered and sphere-like in shape.

Core shell nanoparticles can have desirable properties. For example, core-shell nanoparticles enhances catalytic efficiency of an oxygen reduction reaction (e.g., a catalyst comprising core-shell nanoparticles of the present disclosure exhibits at least 5 times, at least 10 times, at least 15 times, or at least 20 times the efficiency (e.g., activity) relative to platinum/carbon catalysts for oxygen reduction reaction known in the art)

In an aspect, the present disclosure provides compositions. The compositions comprise one or more core-shell nanoparticles of the present disclosure. The core-shell nanoparticles can be disposed on a substrate and/or disposed in a material.

In an example, core-shell nanoparticles are disposed on at least a portion or all of a substrate (e.g., one or more exterior surface of the substrate) and/or the nanoparticles are disposed in a polymer. Examples of substrate materials include, but are not limited to, carbon materials (e.g., carbon materials such as, for example, carbon black, glassy carbon, carbon nanotubes, graphene, carbon fibers, and combinations thereof). Examples of polymers include, but are not limited to, ionomers such as, for example, sulfonated tetrafluoroethylene based fluoropolymer-copolymers (e.g., Nafion®).

The compositions can have various nanoparticle loadings. In an example, the precious metal (e.g., platinum and/or palladium) loading is 10% by weight based on the total weight of the composition.

In an aspect, the present disclosure provides methods of using core-shell nanoparticles of the present disclosure. In various examples, core-shell nanoparticles of the present disclosure are used as catalysts (e.g., as electrocatalysts).

In various examples, a method of catalyzing an oxygen reduction reaction comprises: contacting an electrode (e.g., a cathode) comprising one or more nanoparticles of the present disclosure or a composition of the present disclosure disposed on at least a portion of an exterior surface of the electrode that is in contact with an electrolyte (e.g., an alkaline or acidic medium (e.g., aqueous medium)) with oxygen (e.g., that is present in the alkaline or acidic medium), and providing or applying a current to the electrode, such that anionic oxygen species and/or oxygen species (e.g., $H_2O$, $OH^-$, $O^{2-}$, and combinations thereof) are formed by one or more oxygen reduction reaction. In various examples, the electrode is a cathode of an electrochemical cell, electrolyzer, or fuel cell (e.g., a polymer electrolyte membrane fuel cell).

A method of catalyzing an oxygen reduction reaction can also include a negative electrode that generates hydrogen ions and current. Accordingly, in various examples, the methods above further comprise: providing a negative electrode having at least a portion of an exterior surface of the electrode that is contact with an electrolyte (e.g., an alkaline or acidic medium (e.g., aqueous medium)) with hydrogen (e.g., that is present in the alkaline or acidic medium), such that hydrogen ions are produced and current generated at the negative electrode. In various examples, the electrode (e.g., cathode) comprising one or more nanoparticles of the present disclosure or composition of the present disclosure and negative electrode are separated (physically and/or electrically) by a polymer (e.g., ionomers such as, for example, sulfonated tetrafluoroethylene based fluoropolymer-copolymers (e.g., Nafion®).

In an aspect, the present disclosure provides devices. The devices comprise core-shell nanoparticles of the present disclosure.

In various examples, a device comprises one or more electrode (e.g., one or more cathode) that comprises one or more nanoparticles of the present disclosure or a composition of the present disclosure. The nanoparticles or composition can be disposed on at least a portion or all of an exterior surface of the electrode, which may be in contact with an electrolyte, if present.

Examples of devices include, but are not limited to, electrochemical cells, electrolyzers, and fuel cells. The electrode is an electrode (e.g., cathode) of the electrochemical cell, electrolyzer or fuel cell (e.g., a polymer electrolyte membrane fuel cell).

The steps of the methods described in the various embodiments and examples disclosed herein are sufficient to carry out the methods of the present disclosure. Thus, in various examples, a method consists essentially of a combination of the steps of the methods disclosed herein. In various other examples, a method consists of such steps.

The following Statements provide embodiments and/or examples of nanoparticles (e.g., $CeO_2$ nanoparticles) having domains of one or more copper species, methods of the present disclosure (e.g., methods of making materials of the present disclosure), and articles of manufacture of the present disclosure (e.g., articles of manufacture comprising one or more layers of the present disclosure):

Statement 1. A core-shell nanoparticle having a solid core comprising a first metal (e.g., a non-precious transition metal such as, for example, cobalt) and a shell comprising a second metal (e.g., a precious metal such as, for example, platinum, palladium, or semi-precious metal such as, for example, iridium, rhodium, ruthenium) disposed on at least portion of an exterior surface or all of the exterior surface of the core.

Statement 2. The core-shell nanoparticle of Statement 1, wherein the shell further comprises a third metal (e.g., as an alloy) selected from nickel, iron, palladium, and combinations thereof (e.g., the shell is a platinum-nickel, platinum-iron, palladium-nickel, palladium-iron, platinum-palladium, or platinum-palladium-nickel alloy).

Statement 3. The core-shell nanoparticle of Statements 1 or 2, wherein the nanoparticle has a longest dimension (e.g., diameter) of 7 nm to 12 nm.

Statement 4. The core-shell nanoparticle of any one of the preceding Statements, wherein the core has a longest dimension (e.g., diameter) of 3 nm to 10 nm.

Statement 5. The core-shell nanoparticle of any one of the preceding Statements, wherein the shell thickness (e.g., a uniform shell thickness) is 0.5 nm to 2 nm.

Statement 6. The core-shell nanoparticle of any one of the preceding Statements, wherein the core and/or shell is spherical.

Statement 7. The core-shell nanoparticle of any one of the preceding Statements, wherein the core and/or shell is polycrystalline (e.g., core having disordered polycrystalline domains and/or shell having (e.g., a majority of) (111) surfaces).

Statement 8. The core-shell nanoparticle of any one of the preceding Statements, wherein the nanoparticle enhances catalytic efficiency of a reaction (e.g., oxygen reduction reaction).

Statement 9. A composition comprising one or more nanoparticles of any one of the preceding Statements disposed on at least a portion of a substrate.

Statement 10. The composition of Statement 9, wherein the one or more nanoparticles are disposed on at least a portion of an exterior surface of the substrate.

Statement 11. The composition of Statements 9 or 10, wherein the substrate comprises a carbon material (e.g., carbon materials such as, for example, carbon black, and glassy carbon).

Statement 12. The composition of any one of Statements 9-11, wherein the one or more nanoparticles are disposed in a polymer (e.g., an ionomer such as, example, sulfonated tetrafluoroethylene based fluoropolymer-copolymers (e.g., Nafion®).

Statement 13. The composition of any one of Statements 9-12, wherein the precious metal loading is 10% by weight.

Statement 14. A method of making a core-shell nanoparticle of any one of Statements 1-13 comprising:
  a) providing a first metal precursor compound comprising one or more carbonyl ligand (e.g., a transition metal carbonyl compound such as, for example, cobalt carbonyl) in a solvent (e.g., organic solvents such as for example, dichlorobenzene) to form a reaction mixture;
  b) heating the reaction mixture (e.g., to 140-180° C.) from a), wherein nanoparticles comprising a first metal are formed;
  c) adding a second metal precursor compound (e.g., a precious metal coordination compound or organometallic compound such as, for example, platinum acetylacetonate) to the reaction mixture from b) (e.g., at a temperature of 140-180° C.), wherein a shell comprising a second metal is formed on the nanoparticles comprising a the first metal are formed.

Statement 15. The method of Statement 14, wherein the second metal precursor is dissolved in a solvent (e.g., an organic solvent such as, for example, oleylamine and dichorobenzene).

Statement 16. A method of catalyzing an oxygen reduction reaction comprising:
  contacting an electrode (e.g., a cathode) comprising one or more nanoparticles of any one of Statements 1-8 or a composition of any one of Statements 9-14 disposed on at least a portion of an exterior surface of the electrode that is in contact with an electrolyte (e.g., an alkaline or acidic medium (e.g., aqueous medium)) with oxygen (e.g., that is present in the alkaline or acidic medium),
  providing or applying a current to the electrode,
  wherein anionic oxygen species and/or oxygen species (e.g., $H_2O$, $OH^-$, $O^{2-}$, and combinations thereof) are formed by one or more oxygen reduction reaction.

Statement 17. The method of claim 14, wherein the method further comprises:
  providing a negative electrode having at least a portion of an exterior surface of the electrode that is contact with an electrolyte (e.g., an alkaline or acidic medium (e.g., aqueous medium)) with hydrogen (e.g., that is present in the alkaline or acidic medium), wherein hydrogen ions are produced and current generated at the negative electrode.

Statement 18. The method of Statement 14, wherein the electrode comprising one or more nanoparticles of any one of Statements 1-8 or a composition of any one of Statements 9-14 and negative electrode are separated (physically and/or electrically) by a polymer (e.g., ionomers such as, for example, sulfonated tetrafluoroethylene based fluoropolymer-copolymers (e.g., Nafion®)).

Statement 19. The method of any one of Statements 16-18, wherein the electrode is a cathode of an electrochemical cell or fuel cell (e.g., a polymer electrolyte membrane fuel cell).

Statement 20. A device comprising an electrode (e.g., a cathode) having one or more nanoparticles of any one of Statements 1-8 or a composition of any one of Statements 9-14 disposed on at least a portion of an exterior surface of the electrode.

Statement 21. The device of Statement 20, wherein the device is an electrochemical cell, electrolyzer or fuel cell and the electrode is an electrode of the electrochemical cell, electrolyzer or fuel cell (e.g., a polymer electrolyte membrane fuel cell).

The following example is presented to illustrate the present disclosure. It is not intended to limiting in any matter.

Example 1

This example provides a description of the synthesis of core-shell nanoparticles of the present disclosure and demonstration of their application as electrocatalysts.

Described is the plating of at least one precious metal on non-precious metal nanoparticles to yield sustainable electrocatalysts. Cobalt/platinum core-shell (denoted as Co@Pt) nanoparticles were synthesized by in situ seed mediated growth using CO as both stabilizing ligand and reducing agent. The obtained Co@Pt nanoparticles exhibited high specific surface area in terms of precious metal content and also enhanced catalytic activity for the oxygen reduction reaction (ORR), the interaction between the core and shell, with the overall improvement in mass activity reaching 10 times the activity versus commercial Pt catalysts. The observed catalytic enhancement was correlated to the nanostructures characterized by scanning transmission electron microscopy (STEM) imaging and element mapping, with the correlation further elucidated by calculations based on the density functional theory (DFT).

Figure 10:
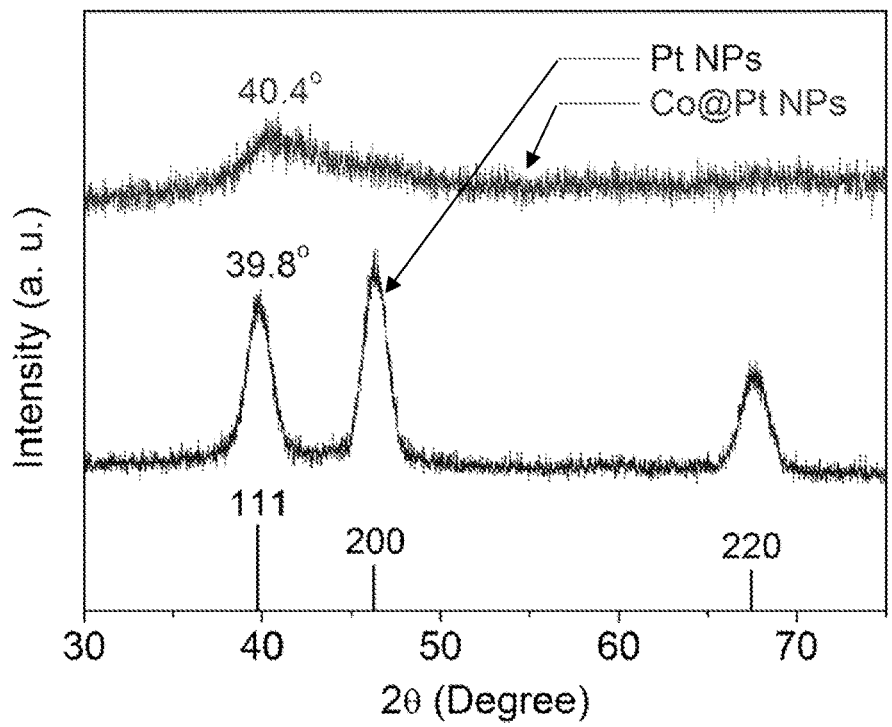
FIG. 10 shows XRD patterns of Pt and as-prepared Co@Pt nanoparticles.

Co nanoparticles were first prepared by thermal decomposition of cobalt carbonyl in an organic solution, and Pt was then overgrown on these Co seeds by adding platinum acetylacetonate (Pt(acac)$_2$) in situ. The Co nanoparticles possessed a highly disordered, polycrystalline nature and sphere-like shape (FIG. 1a), which had directed the growth of the core-shell nanostructure into pseudospherical particles (FIGS. 1 b and c; TEM images described herein). The obtained Co@Pt nanoparticles had an overall dimeter of ~10 nm and a uniform shell thickness of ~1 nm, with most of the lattice fringes exhibited on the STEM images corresponding to the (111) planes of face-centred cubic (fcc) Pt (FIGS. 1 d-f). The XRD pattern collected for the Co@Pt nanoparticles only shows a weak peak at ~40.4°, which can also be assigned to the (111) plane of Pt (FIG. 10). The slight shift of this peak toward high angle in comparison to pure Pt nanoparticles (~39.8°) indicates a compressive strain in the Pt shell of the Co@Pt nanoparticles.

Figure 5:
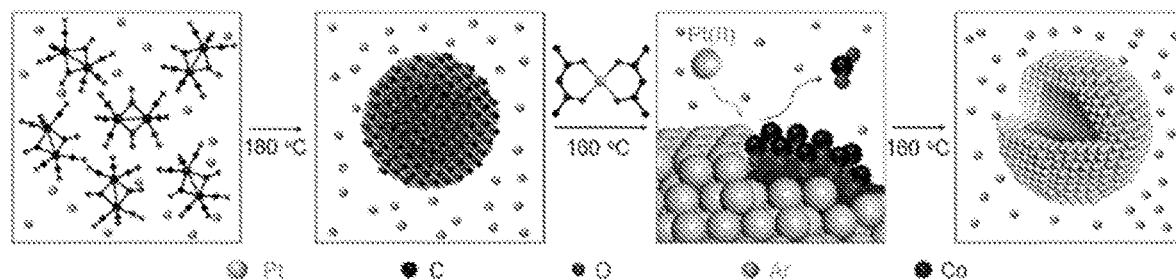
FIG. 5 shows a scheme for a synthesis of Co@Pt nanoparticles by in situ overgrowth of Pt on Co seeds.
Figure 6:
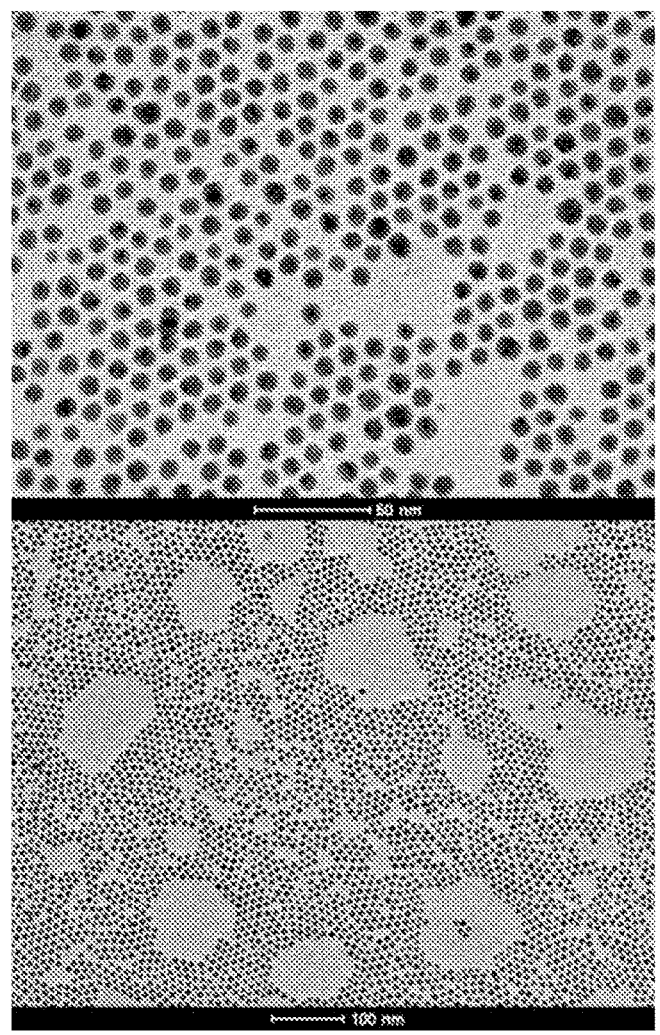
FIG. 6 shows supplemental TEM images of Co nanoparticles collected before Pt shell growth.
Figure 7:
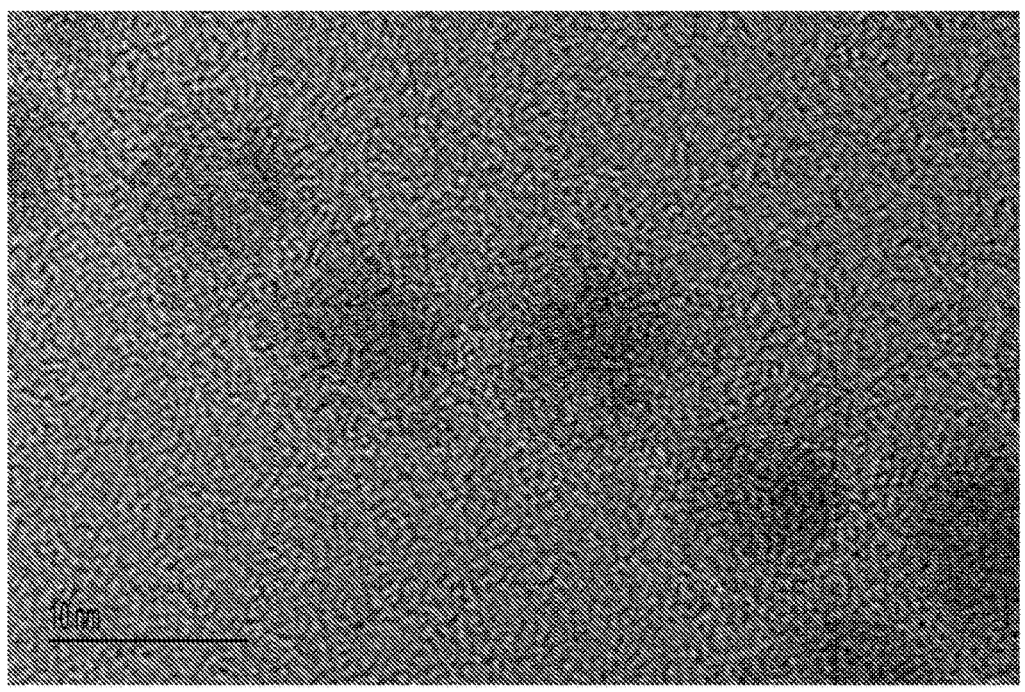
FIG. 7 shows supplemental HRTEM image of Co nanoparticles collected before Pt shell growth.
Figure 8:
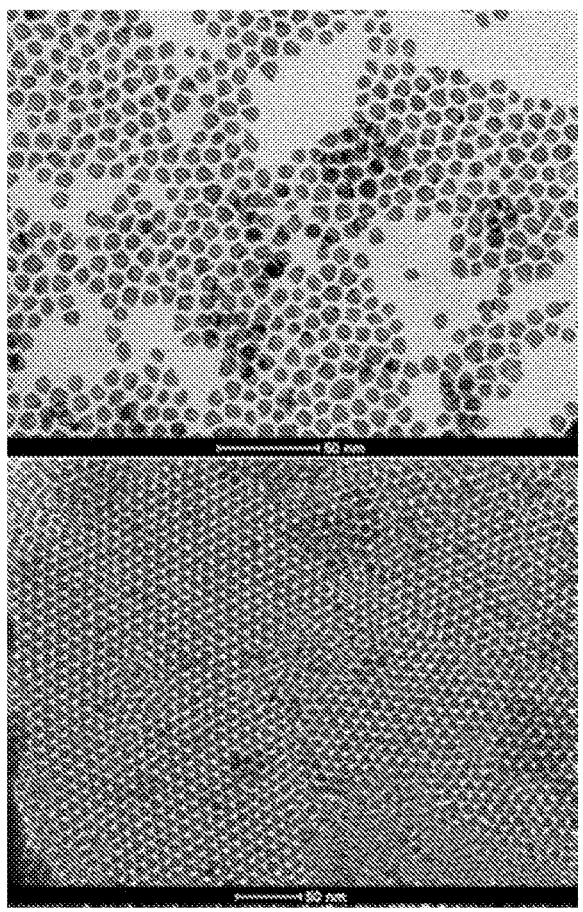
FIG. 8 shows supplemental TEM images of Co@Pt nanoparticles.
Figure 9:
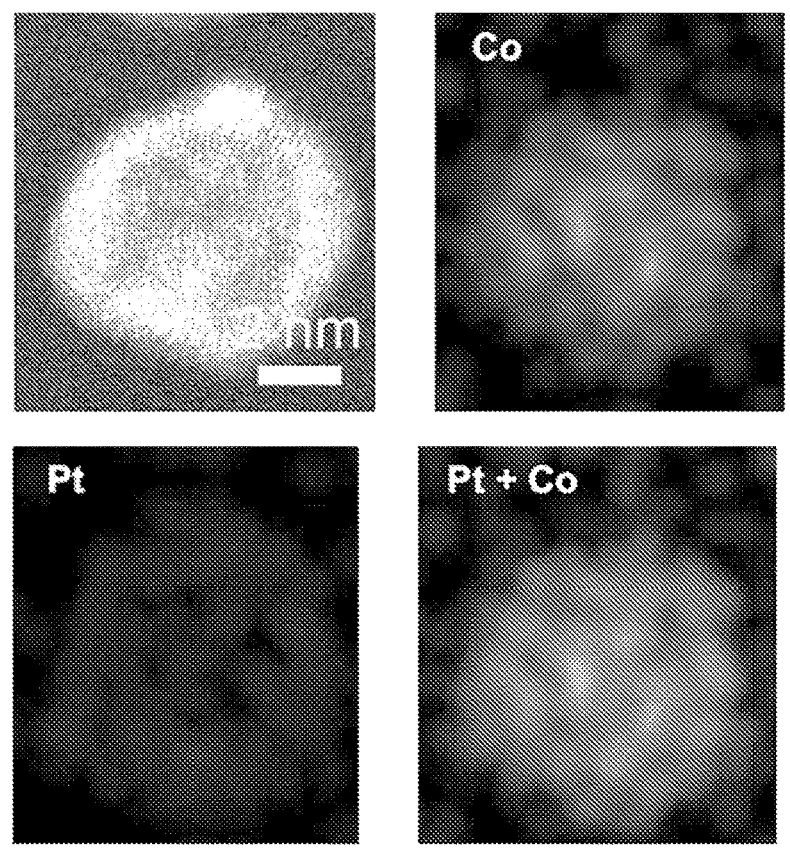
FIG. 9 shows high angle annular dark field (HAADF)-STEM and corresponding elemental mapping images of as-prepared Co@Pt nanoparticles.
Figure 11:
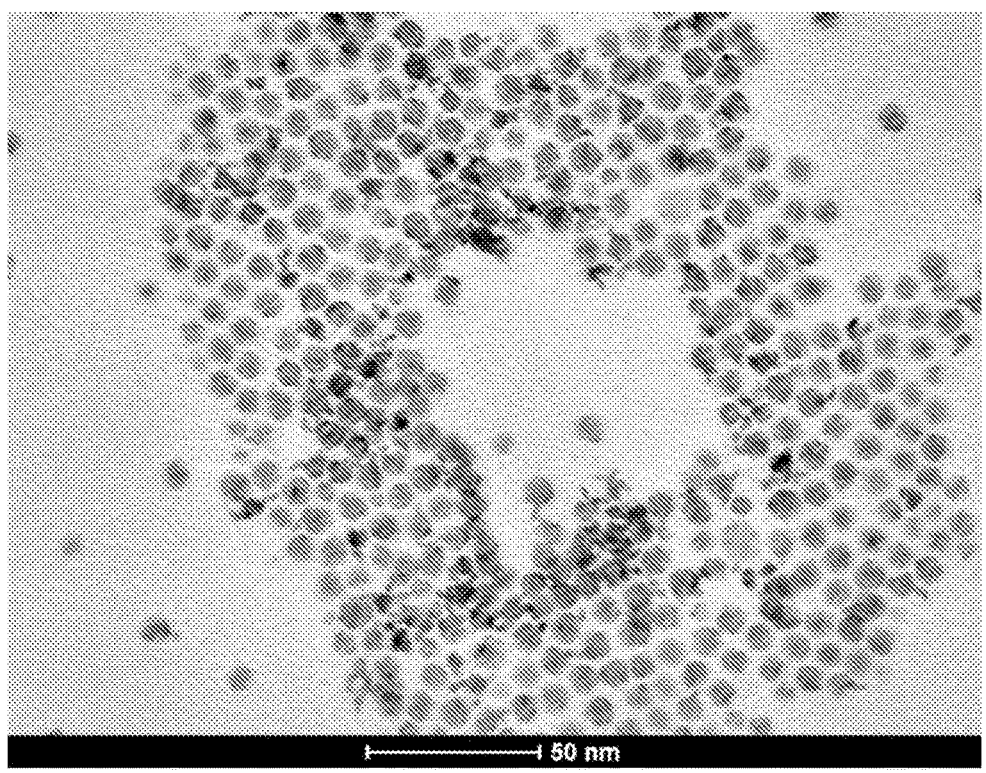
FIG. 11 shows a TEM image of nanoparticles obtained by using washed Co seeds for the preparation of Co@Pt nanoparticles.
Figure 12:
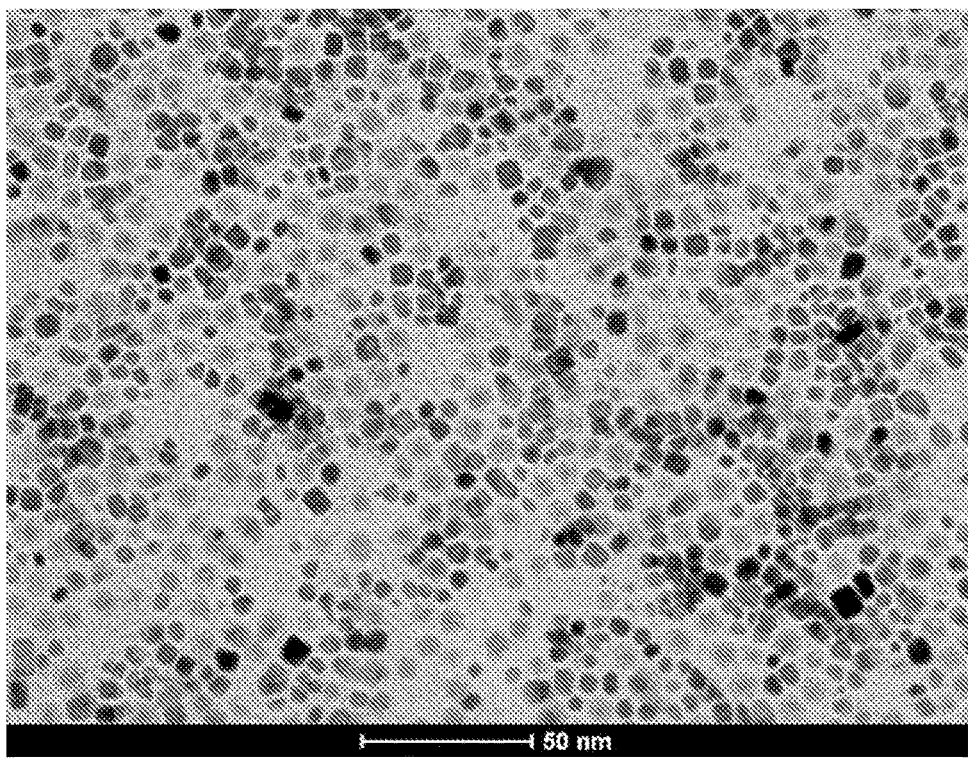
FIG. 12 shows a TEM image of obtained sample without blowing out free CO left in the reaction after Co seeds growth.
Figure 13:
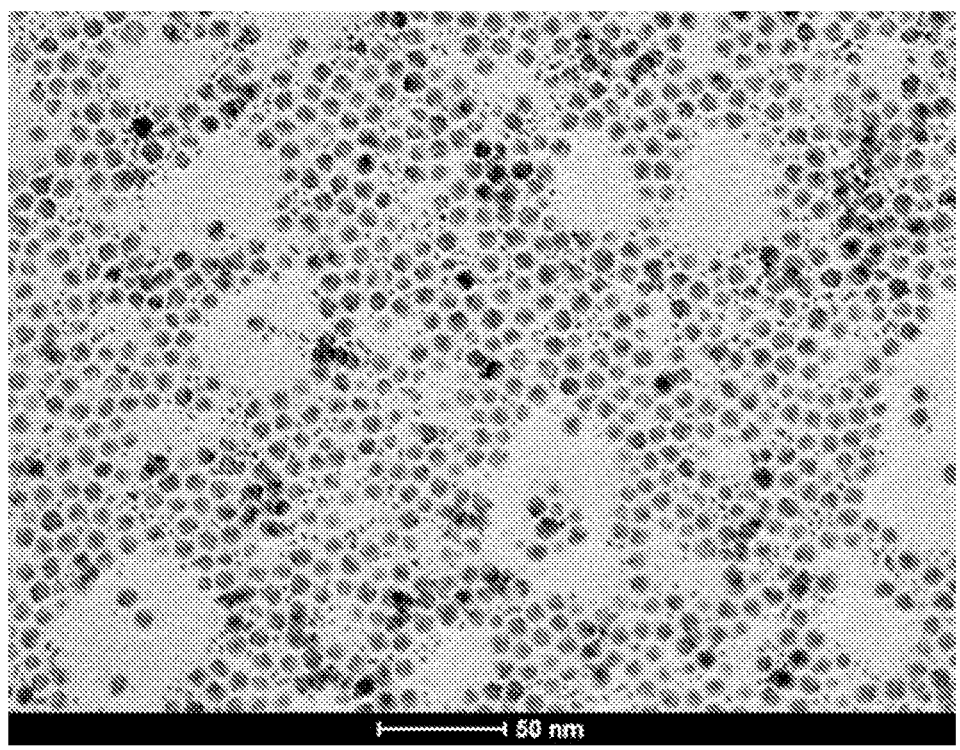
FIG. 13 shows TEM images of obtained sample when injected Pt(acac)$_2$ dissolved in olylamine at 120° C.
Figure 14:
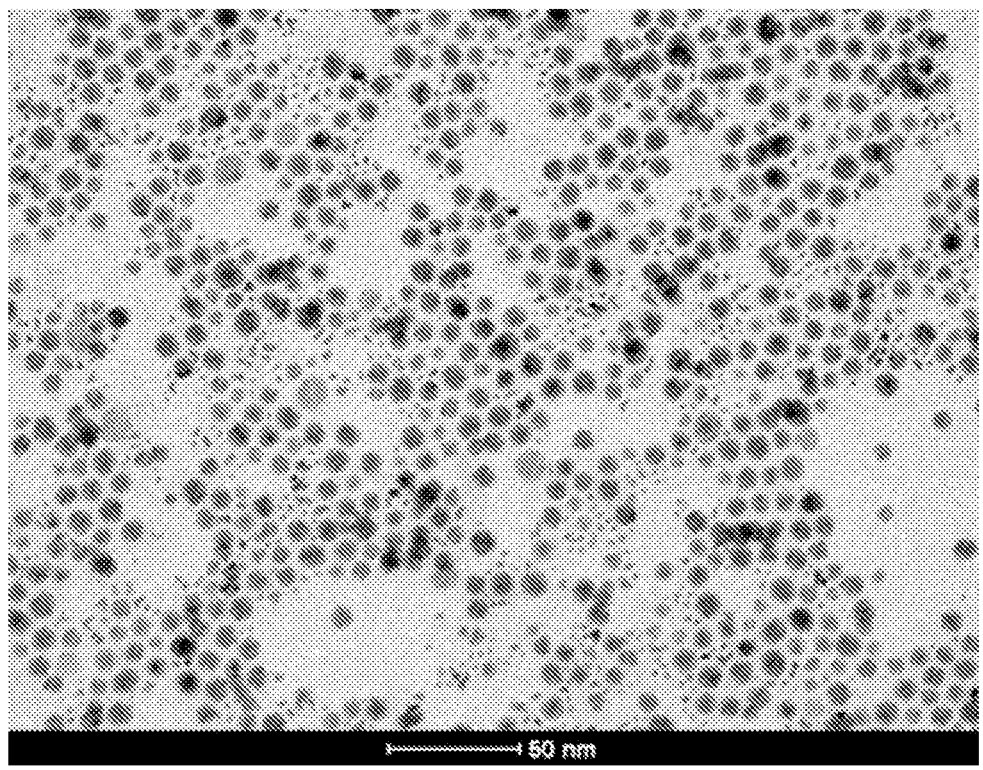
FIG. 14 shows TEM images of obtained sample when injected Pt(acac)$_2$ dissolved in olylamine at 140° C.
Figure 15:
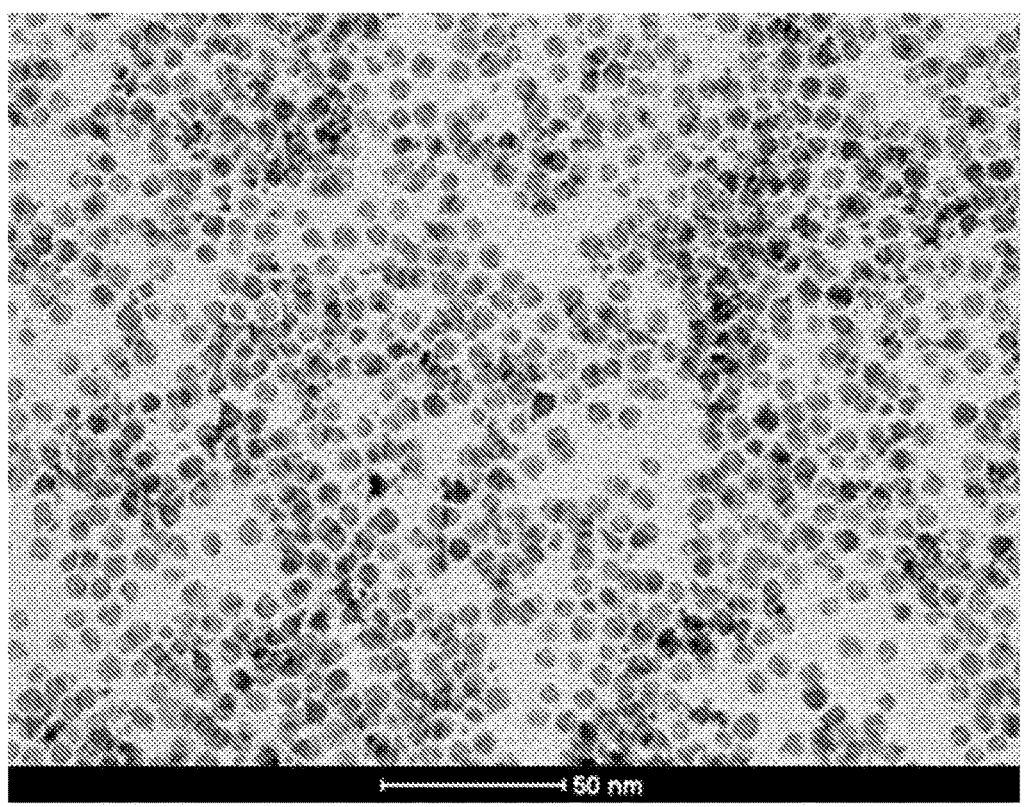
FIG. 15 shows TEM images of obtained sample when injected Pt(acac)$_2$ dissolved in olylamine at 180° C.
Figure 16:
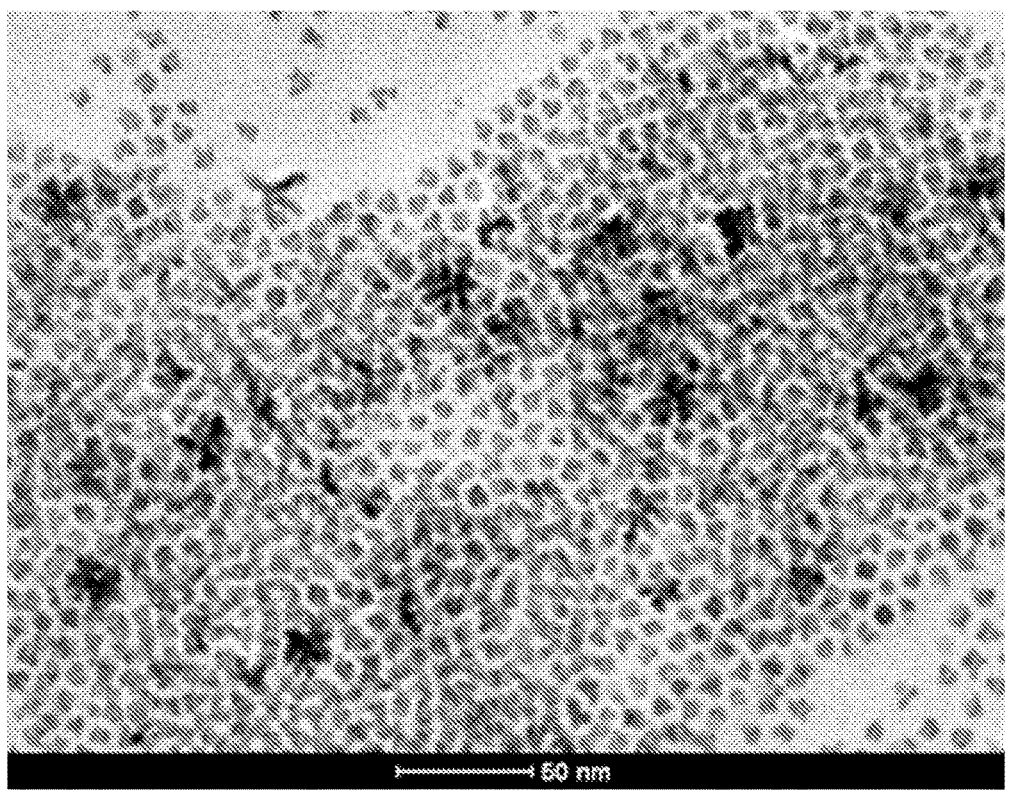
FIG. 16 shows TEM images of obtained sample when injected Pt(acac)$_2$ dissolved in DCB at 120° C.
Figure 17:
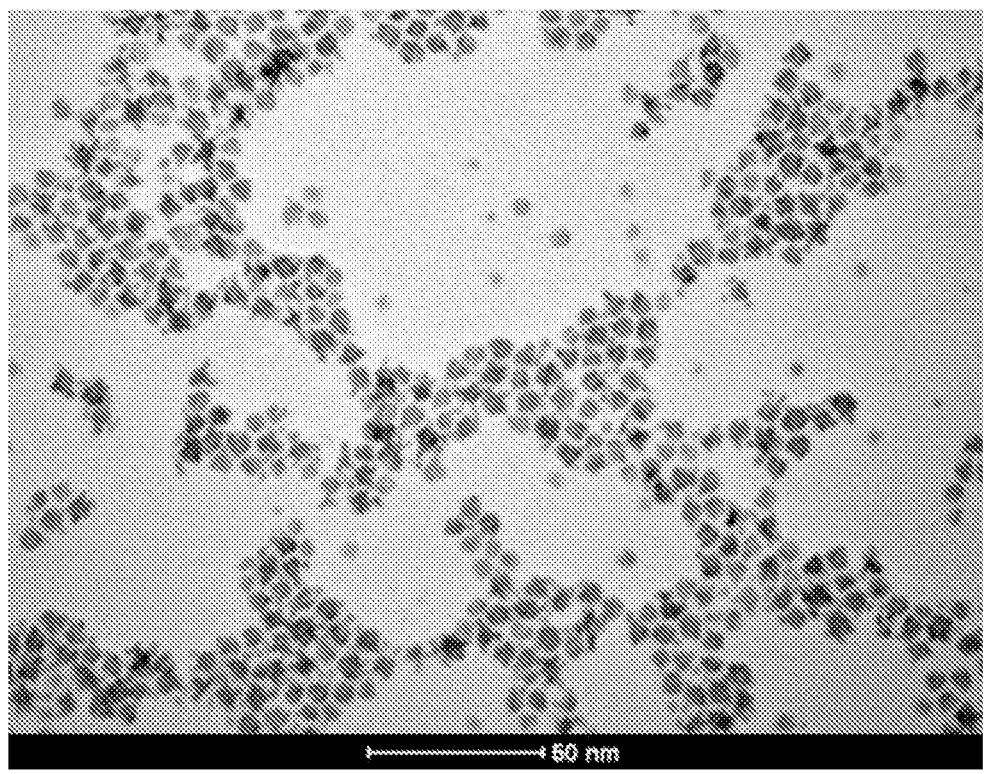
FIG. 17 shows TEM images of obtained sample when injected Pt(acac)$_2$ dissolved in DCB at 140° C.
Figure 18:
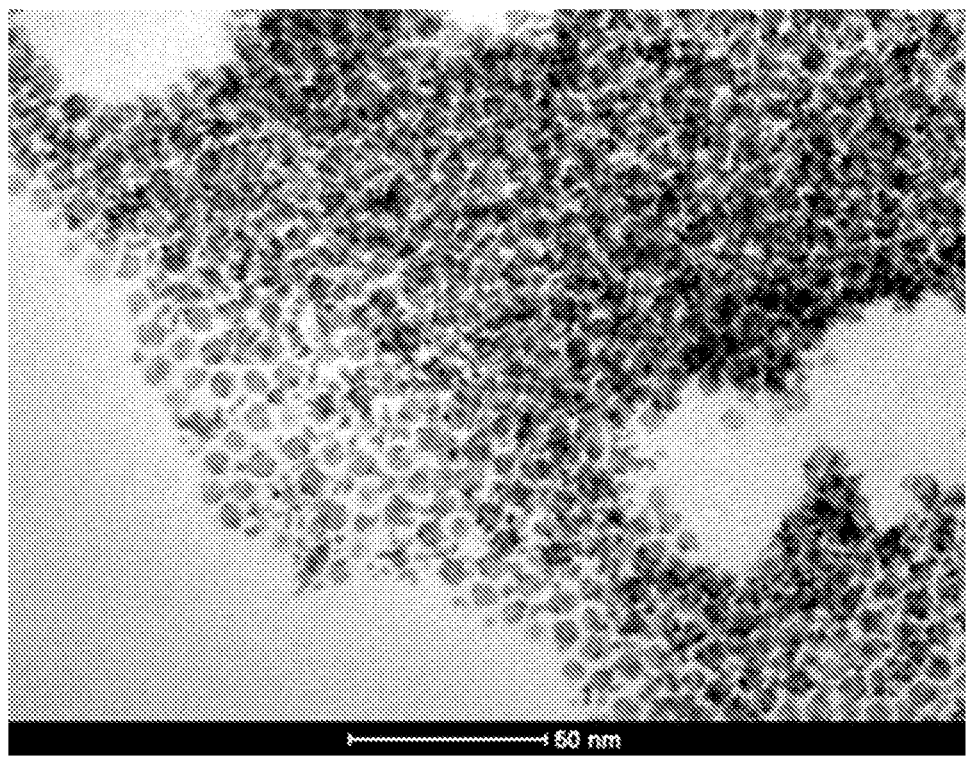
FIG. 18 shows TEM images of obtained sample when injected Pt(acac)$_2$ dissolved in DCB at 160° C.
Figure 19:
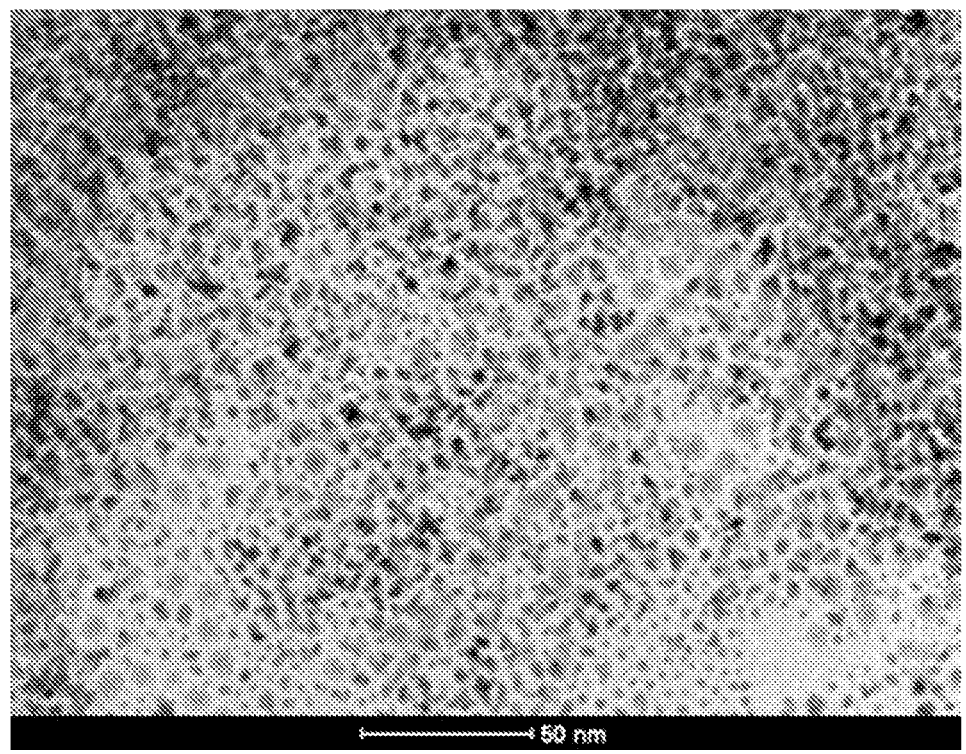
FIG. 19 shows TEM images of obtained sample when injected Pt(acac)$_2$ dissolved in DCB at 180° C.
Figure 20:
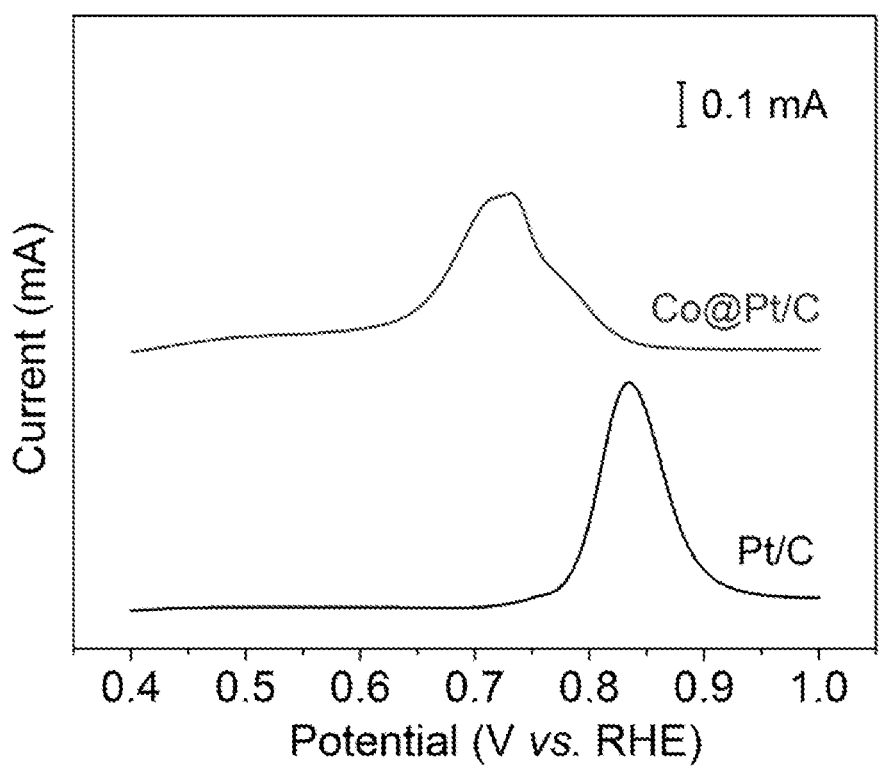
FIG. 20 shows CO stripping curves recorded for Co@Pt/C and Pt/C catalysts. The ECSA of Co@Pt estimated from CO stripping (ca. 60 $m^2/g_{Pt}$) is slightly higher than by using $H_{upd}$ (54 $m^2/g_{Pt}$). This difference can be ascribed to the suppression of hydrogen adsorption on the core-shell catalyst as compared to pure Pt, which is consistent with a previous report on Pt-bimetallic catalysts.[1]
Figure 21:
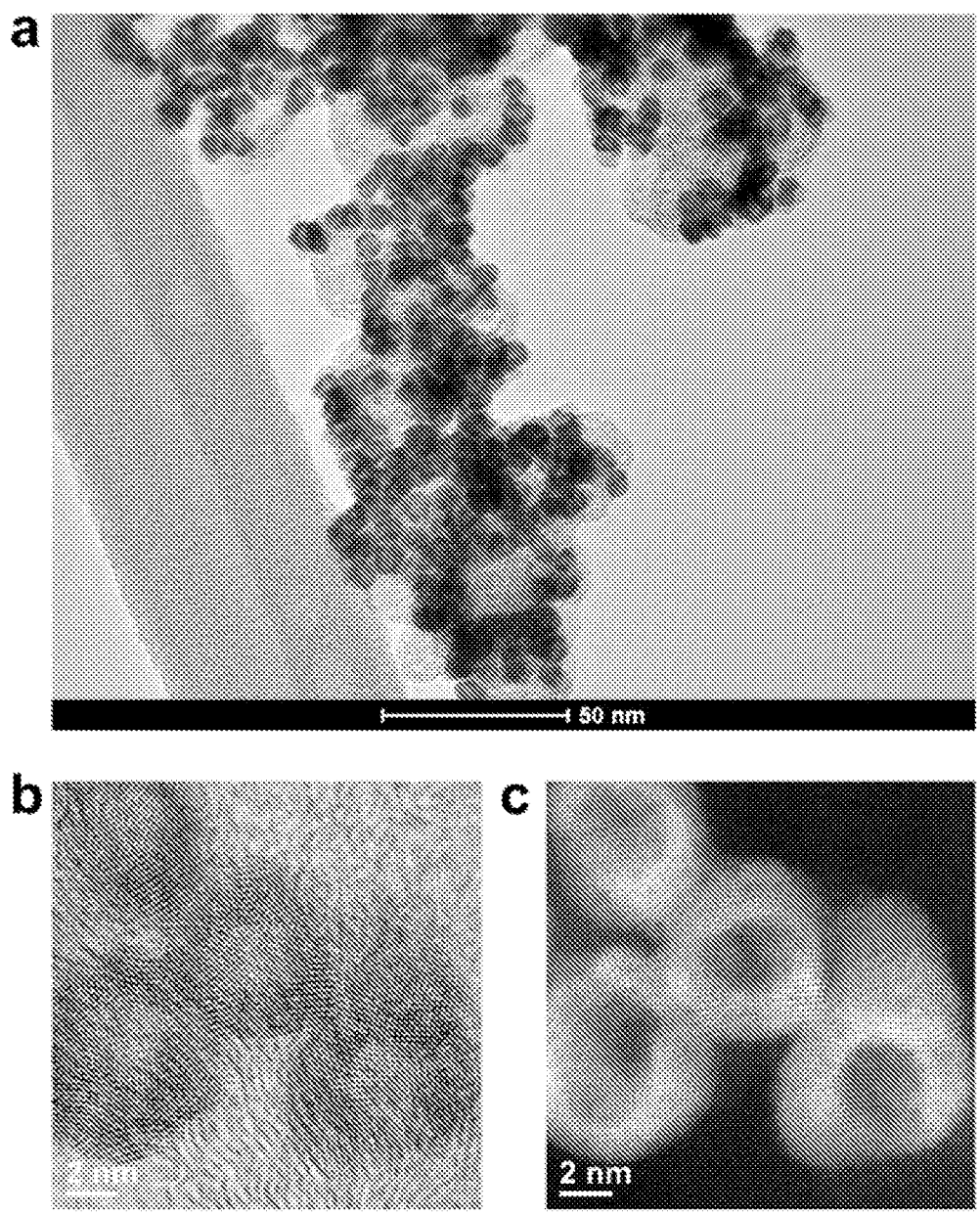
FIG. 21 shows TEM (a), HRTEM (b), and HADDF-STEM (c) images of Co@Pt/C before stability test.
Figure 22:
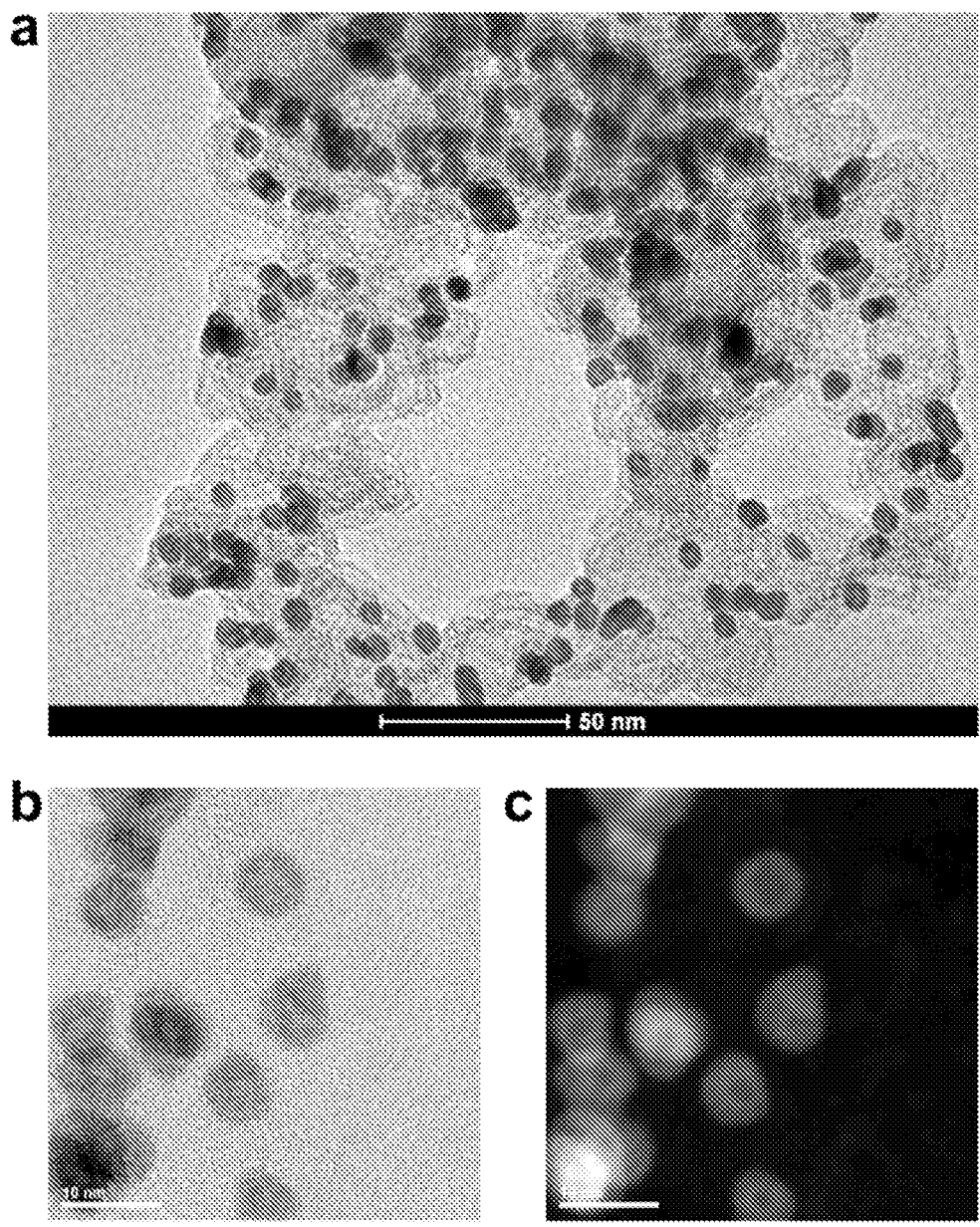
FIG. 22 shows TEM (a), HRTEM (b), and HADDF-STEM (c) images of Co@Pt/C after 5,000 cycles.

During the growth of Co@Pt nanoparticles, a significant amount of CO was generated in situ from the decomposition of cobalt carbonyl. This CO species is believed to play a crucial role in enabling the plating of Pt on Co. Ex situ growth using washed Co seeds resulted in Pt multipods attached on the Co nanoparticles (FIG. 11). On the other side, the presence of extra CO under the in situ growth conditions was found to be detrimental for Pt overgrowth as well and led to the formation of separate Pt nanoparticles (FIG. 12). CO has previously been used as both reducing agent and stabilizing ligand in shape-controlled synthesis of Pt and Pt-alloy nanoparticles, where CO was either introduced by flowing or generated by decomposition of metal carbonyls in situ. Such a dual role can also be effective in the growth of Co@Pt nanoparticles reported here. Considering the strong binding of CO to the cobalt surface (with a heat of adsorption of ca. −1.34 eV per molecule), it is likely that a layer of CO adsorbed on the surface of the Co seeds even after extra CO in the solution was blown out by $N_2$. These CO adsorbates could have protected the Co seeds from oxidation (e.g., due to direct galvanic reaction with the Pt salt) and also served as in situ reductant for facilitating the nucleation of Pt (FIG. 5). This led to a distinct growth mechanism from the galvanic replacement that has widely been adopted for overgrowth of a noble metal onto a less-noble metal nanoparticle. The latter case usually results in hollow or porous nanoparticles, whereas the CO-mediated growth reported here has produced solid core-shell nanoparticles, as evidenced by the peak observed for Co shown in the composition line profile (FIG. 10. The preservation of Co in the core could be important for maintaining the intermetallic coupling effects for catalytic enhancement. It needs to be pointed out that, besides CO, the reaction temperature and the solvent used for adding the Pt precursor were found to be also important for ensuring the complete coating of Co with Pt (FIGS. 13-19).

The obtained Co@Pt nanoparticles were loaded on carbon black and evaluated as electrocatalysts for the ORR. The cyclic voltammogram (CV) of Co@Pt exhibits more pronounced peaks for underpotential deposition of hydrogen ($H_{upd}$) (at E<0.4 V) than Pt. (FIG. 2a). The specific electrochemically active surface area (ECSA) estimated from the $H_{upd}$ charges are 54 and 43 $m^2/g_{Pt}$ for Co@Pt and Pt, respectively. Although the overall particle size of Co@Pt is significantly larger than Pt (~5 nm), the Co@Pt catalyst has a higher specific surface area owing to the presence of non-precious cobalt in the particle core. From the CVs, it can be seen that Co@Pt displays a positive shift of 40 mV as compared to Pt for the adsorption peak of oxygenated species (e.g., $OH_{ad}$, at 0.8-0.9 V) in the anodic scans, albeit the peak being more pronounced which can be ascribed to the higher ECSA of the core-shell catalyst at the same loading (ca. 20 $\mu g_{Pt}/cm^2$). A similar shift can also be seen in the cathodic scans. These observations suggest that the surface of Co@Pt is less oxophilic and has weaker binding to the oxygenated species than the surface of pure Pt, which is desired for lowering the kinetic barrier of the ORR. Such an anticipation is confirmed by the ORR polarization curves shown in FIG. 2b, where Co@Pt exhibits a positive shift of 68 mV in half-wave potential as compared to Pt, and the Tafel plots shown in FIG. 2c, with Co@Pt having a lower Tafel slope (43 mV/dec) than Pt (55 mV/dec). The kinetic current densities (specific activities) were calculated to be 2.24 and 0.36 mA/cm$^2$ (at 0.9 V) for Co@Pt and Pt, respectively (FIG. 2d). Correspondingly, the mass activity of Co@Pt achieved 1.21 A/mg$_{Pt}$, which represents an improvement factor of 8.1 versus the commercial Pt catalyst (FIG. 2e).

Figure 2:
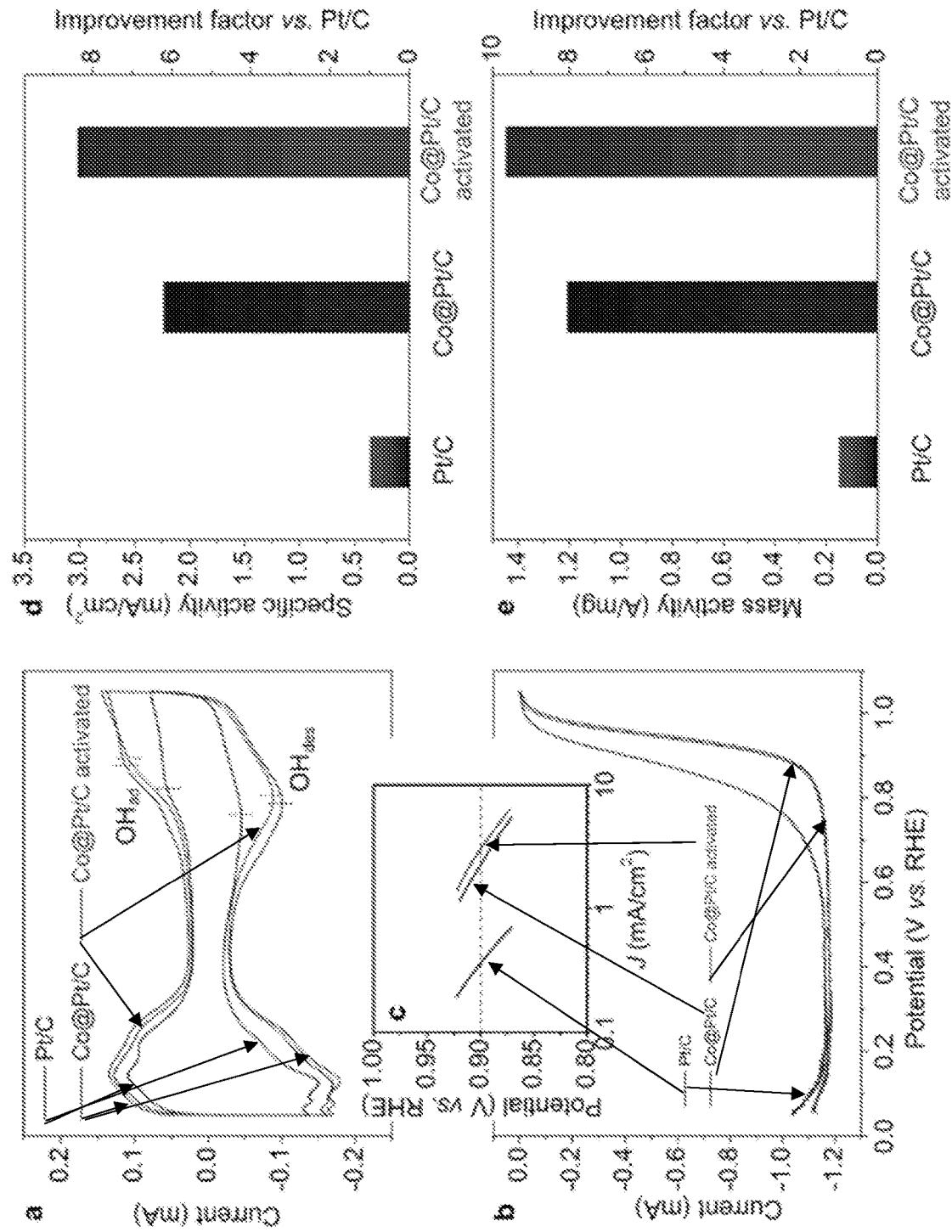
FIG. 2 shows electrochemical properties and ORR activities of Co@Pt catalysts in comparison to commercial Pt catalysts. (a) Cyclic voltammograms (CVs). (b) ORR polarization curves. (c) Tafel plots. (d, e) Summary of specific activities and mass activities. An activated Co@Pt/C was obtained by cycling the potential between 0.6 and 1.0 V for 5,000 times.
Figure 3:
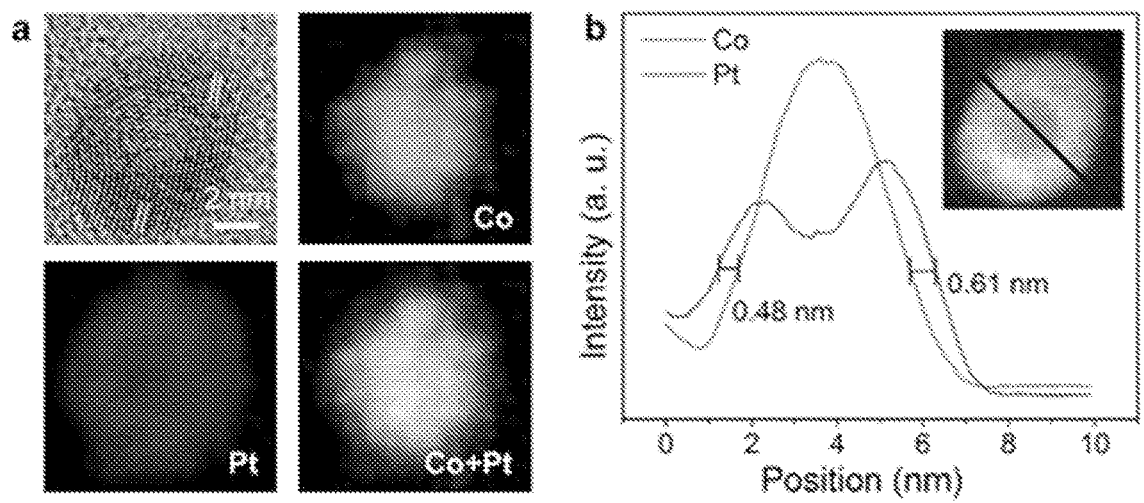
FIG. 3 shows (a) a representative HRTEM image (top left) and elemental maps collected for Co@Pt catalyst after 5,000 potential cycles between 0.6 and 1.0 V. The (111) planes are marked in white in the HRETEM image. (b) Line profiles of the distribution of Co and Pt across a Co@Pt nanoparticle after potential cycling.
Figure 23:
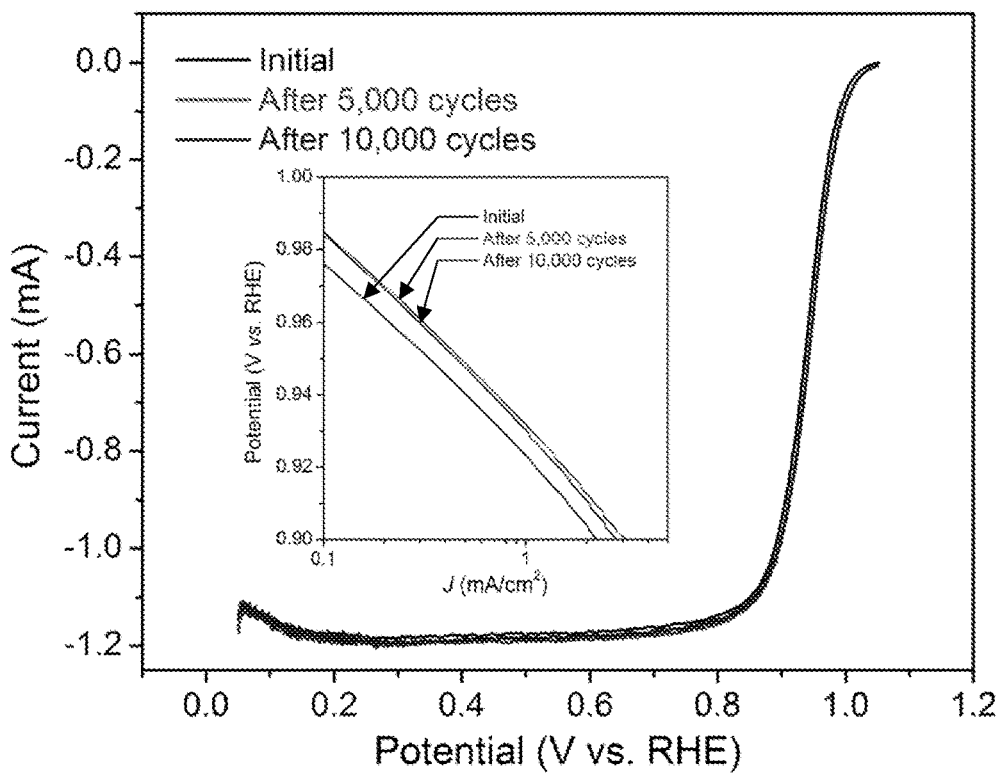
FIG. 23 shows polarization curves for the ORR recorded after 5,000 and 10,000 potential cycles between 0.6 and 1.0 V.
Figure 24:
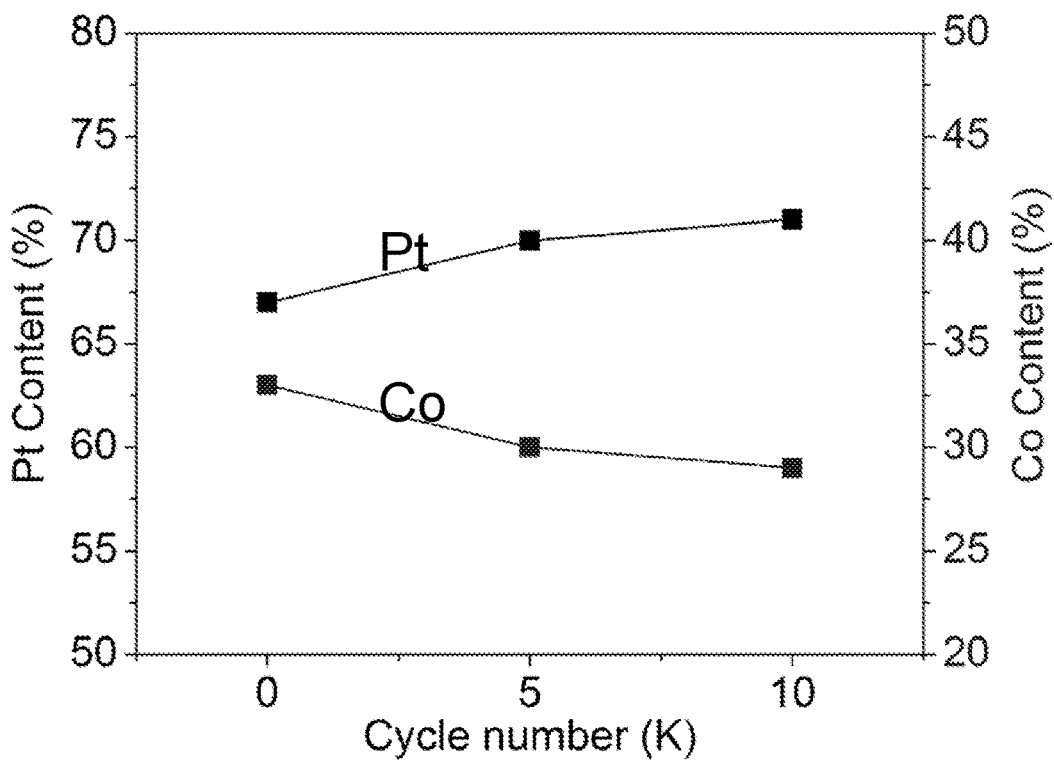
FIG. 24 shows the element composition of Co@Pt/C catalysts measured by (inductively coupled plasma) ICP-MS during the stability studies.

After the demonstration of enhanced ORR catalytic activity, durability of the Co@Pt catalyst was further studied by cycling the electrode potential between 0.6 and 1.0 V. The Co@Pt nanoparticles exhibited increase in catalytic activity upon potential cycling. After 5,000 cycles, the specific activity was raised to 3.02 mA/cm$^2$, while negligible loss was observed in ECSA (FIGS. 2 a and d). As a result, the mass activity achieved 1.45 A/mg$_{Pt}$ after the potential cycling, corresponding to an improvement factor of 9.7 versus Pt (FIG. 2e). The loss in catalytic activity after further potential cycling was found to be insignificant (e.g., up to 10,000 cycles, FIG. 23). "Activation" by potential cycling has previously been reported on Pt—Ni alloy nanoparticles, which was ascribed to compositional segregation and surface restructuring induced by dealloying. The activation of Co@Pt observed here, however, may be via a different mechanism. STEM images and element maps collected for the Co@Pt nanoparticles after potential cycling show that the core-shell nanostructure was clearly preserved, albeit a slight decrease of the shell thickness from ~1 nm to 0.5-0.6 nm, with the later corresponding to about two atomic layers of Pt (FIG. 3, TEM images described herein). The protection of Co from leaching out is further evidenced by the nearly consistent compositions measured before and after potential cycling by using inductively coupled plasma mass spectrometry (ICP-MS) (FIG. 24). The decrease of Pt-shell thickness could be either due to the dissolution of a small of Pt from the particle surface, as previously reported for Pt/C catalysts, or caused by element diffusion at the interface between Co and Pt.

Figure 4:
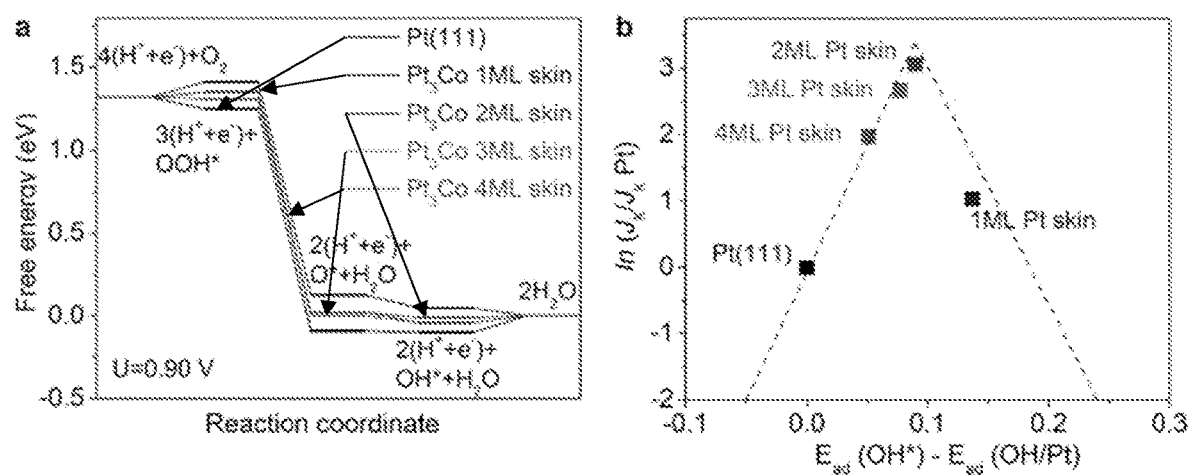
FIG. 4 shows (a) Calculated potential profiles of ORR on Pt(111) and Pt-skin surfaces; (b) volcano plot of ORR activity depending on the binding energy of hydroxide (OH) for the different types of surface, with the dash line showing the predictions using Pt(111) surface with varying extents of strain.[9]

To understand the observed catalytic enhancement and activation, DFT calculations were performed to depict the structure-property correlations of the Co@Pt nanoparticles (FIG. 4). It has previously been reported that the ORR on Pt is limited by the oxidative desorption of OH$_{ad}$ due to the rather strong binding of OH to Pt, and weakening of the Pt—OH binding by ~0.1 eV is desired to reach the maximum ORR activity (FIG. 4a). For the bimetallic Pt—Co catalysts with Pt-skin surfaces, the reduction of OH binding energy in comparison to Pt varies from ~0.05 to ~0.2 V as the skin thickness varies from 4 to 1 monolayers, which is primarily a result of the strain effect (albeit some contribution from ligand effects for the one-monolayer skin). This trend gives rise to a volcano-type of dependence for the ORR activity on the Pt-skin thickness, with the two-monolayer skin reaching the peak and having the highest activity (FIG. 4b). Thereby, the enhanced catalytic activity of the Co@Pt nanoparticles can be ascribed to the formation of Pt-skin type of surfaces, while the further activation may originate from the evolution of Pt-skin thickness during potential cycling (FIG. 3).

The plating of Co nanoparticles with Pt. was demonstrated. Complete coating of Co with Pt was achieved by in situ seed mediated growth and taking advantage of CO to protect the Co seeds. The Co@Pt nanoparticles do not only show increased specific surface areas in terms of precious metals, but also exhibit enhanced catalytic activity for electrocatalytic reduction of oxygen. The overall improvement in mass activity reached ~10 times versus Pt. Moreover, the Co@Pt nanoparticles were found to be stable under potential cycling in the ORR-relevant potential regions, with the nonprecious metal in the core protected from leaching out by the precious metal shell. By combining STEM imaging, element mapping and DFT calculations, we were able to ascribe the observed catalytic enhancements to the dependence of ORR activity on the Pt-shell thickness of the Co@Pt nanoparticles. Our work highlights the potential of core-shell nanostructures in the development of sustainable electrocatalysts for energy conversion applications.

Synthesis and Characterization Details.

Materials.

Dioctylamine (97%, Sigma Aldrich), 1,2-dichlorobenzene (99%, Sigma Aldrich), oleic acid (90%, Sigma Aldrich), oleylamine (70%, Sigma Aldrich), Dicobalt octacarbonyl (Co$_2$(CO)$_8$, with 1-5% hexane, ≥90%, Alfa Aesar), Nafion (5% in lower aliphatic alcohols and water (15-20%), Sigma Aldrich), Platinum(II) acetylacetonate (Pt(acac)$_2$, ≥99.8% trace metals basis, Sigma Aldrich), and Perchloric acid (70%, 99.999% trace metals basis, Sigma Aldrich) were used as received. High purity (99.999%) argon (Ar), oxygen (O$_2$), and carbon monoxide (CO) were purchased from Air Gas.

Growth of Co@Pt Nanoparticles.

Besides CO (FIGS. 11 and 12), we found the successful growth of Pt shell on Co was also dependent on the conditions for injection of the Pt precursor. Uniform Co@Pt nanoparticles were only obtained by the injection of Pt(acac)$_2$ dissolved in oleylamine at 160° C. Free Pt and heterodimer-like Co—Pt nanoparticles were obtained when the injection temperature was altered to 120 (FIG. 13), 140 (FIG. 13), and 180° C. (FIG. 15), respectively. Similar results were also observed when other solvents instead of oleylamine were used to dissolve the Pt precursor (see, e.g., the case of dichlorobenzene shown in FIGS. 16-19).

Characterization.

TEM images were acquired on an FEI Tecnai 12 microscope, and high-resolution S/TEM images and EDS analysis were performed on a JEOL 2200FS aberration-corrected microscope which is equipped with a BrukerAXS X-Flash Si drift detector (SDD) spectrometer. ICP-AES was performed on a Varian 710-ES. X-ray diffraction (XRD) patterns were collected on a PAN analytical X'Pert$^3$ Powder X-Ray Diffractometer equipped with a Cu K$_\alpha$ radiation source.

Electrochemical Studies.

Preparation of Co@Pt/C Catalysts.

20 mg of as-prepared Co@Pt core-shell nanoparticles in toluene and 20 mg of high-surface carbon (TANAKA) were mixed together and ultra-sonication for 30 min in order to obtain homogeneous distribution of Co@Pt nanoparticles on carbon. The Co@Pt/C was precipitated by centrifuge at 10,000 rpm for 10 min. To get rid of excessive ligand, the Co@Pt/C was further re-disperse in hexane and following by centrifuge at 10000 rpm for 10 min by 2 more times. After that, the washed Co@Pt/C was dried and annealed at 185° C. in an oven under air atmosphere for overnight. Total Pt loading was controlled to be ~20%. ICP-MS was used to determine the actual loading of Pt.

Electrode Preparation.

The catalysts were prepared as catalyst inks by adding water containing 10% isopropanol and 0.05% Nafion® (1 ml catalysts/ml liquid), followed by an ultra-sonication for 1 h. After that, 20 μL inks were deposited on the glassy carbon electrode (5 mm in diameter) and dried to form a uniform thin film that was further characterized in electrochemical cell. The actual loading of Pt on the glass carbon disk is around 0.02 mg/cm$^2$.

DFT Calculations

Periodic Density Functional Theory (DFT) calculations were performed with the projected augmented wave (PAW) method and PBE exchange-correlation functionals, as implemented in the Vienna Ab-initio Simulation Package (VASP). Pt and Co@Pt catalysts were modeled with a 8 ML Pt(111)-(2×2) slab and 1-4 ML Pt(111)-(2×2) skin supported on a Pt—Co alloy substrate with a total thickness of 8 ML, respectively. CO oxidation and ORR intermediates were adsorbed on Pt side of the slabs. The slab and the images were separated by at least 14 Å vacuum, and dipole corrections were employed to screen the artificial interaction through the vacuum region. A cutoff energy of 400 eV and a k-point grid of (7×7×1) were used for the plane wave expansion and Brillouin zone integration, respectively. An orthorhombic box (14×15×16) A and a single k-point (0.25, 0.25, 0.25) were employed for gas phase species. The equilibrium geometries were obtained when the maximum atomic forces are smaller than 0.02 eV/A and by employing a total energy convergence of $10^{-5}$ eV for the electronic self-consistent field loop. The above computational setups and parameters have been verified to be well converged. The adsorption energies were calculated with a water reference scheme, and the free energies were analyzed with computation hydrogen electrode concept.[4]

For the oxygen reduction reaction, a well-established association mechanism is considered, for which oxygen reduction go through 4 steps, $$O_2 + 4H^+ + 4e^- \rightarrow OOH^* + 3H^+ + 3e^- \quad (1a)$$

$$OOH^* + 3H^+ + 3e^- \rightarrow O^*H_2O + 2H^+ + e^- \quad (1b)$$

$$O^*H_2O + 2H^+ + e^- \rightarrow OH^* + H_2O + H^{+\cdot}e^- \quad (1c)$$

$$OH^* + H_2O + H^{+\cdot}e^- \rightarrow 2H_2O + * \quad (1d)$$

The free energy of ORR on Pt(111) and Pt—Co bimetallics with various skin thickness are given in FIG. 4 for the most favourable sites. For a specific site, if we define $$\Delta G(U) = \max(\Delta G_{8a}(U), \Delta G_{8b}(U), \Delta G_{8c}(U), \Delta G_{8d}(U)) \quad (2)$$

where $\Delta G_8(U) = \Delta G_8(0) + eU$. Then the rate constant for the ORR reaction, controlled by a rate limiting step in the above 4 steps, can be written as $$k(U) = k_0 e^{-\Delta G(U)/k_B T} \quad (3)$$

In units of current density, the rate constant is $$i_k(U) = \frac{4e}{A} k(U) \quad (4)$$

where A is the surface area per site. The equation 4 can be further expressed as $$i_k(U) = i_k^0 e^{-\Delta G(U)/k_B T} \quad (5)$$

$i_k^0$ can be obtained by fitting experimental data. Alternatively, we can circumvent the fitting process by focussing the relative current density versus that on Pt(111).

$$i_k / i_k^{Pt} = e^{-(\Delta G(0) - \Delta G^{Pt}(0))/k_B T} \quad (6)$$

If we define the $\eta_{min}$ as the overpotential at which $\Delta G(U)=0$ (the minimum overportential for the forward reaction without thermodynamic barrier, $U_{max}$ is the corresponding max potential) and $\eta = U_0 - U$ ($U_0 = 1.23$ V), then equation (5) can be re-written as $$i_k / i_k^{Pt} = e^{-e(\eta_{min} - \eta_{min}^{Pt})/k_B T} = e^{-\Delta \eta_0 / k_B T} \quad (14)$$

by rewriting $\Delta G_8(U) = \Delta G_8(0) + eU_{max} + e(U - U_{max})$, where $U_{max} = U_0 - \eta_{min}$. The averages of the relative current density from different adsorption site versus OH bonding energy are given in FIG. 4. We note that the OH binding energies have been weighted based the calculated current density of each site.

TABLE 1

Adsorption energies (in eV) of OOH, O and OH on Pt(111) and Pt—Co bimetallics with various skin thickness and subsurface composition (for 1 ML skin).

| | | sites | | | |
|---|---|---|---|---|---|
| adsorbate | skin thickness (ML) | 1 | 2 | 3 | 4 |
| OOH | 1 (sub50% Co) | 4.08 | 4.08 | 4.14 | 4.14 |
| | 1 (sub25% Co) | 4.09 | 4.07 | 4.09 | 4.03 |
| | 2 | 3.97 | 3.97 | 3.97 | 3.99 |
| | 3 | 3.94 | 3.94 | 3.93 | 3.96 |
| | 4 | 3.94 | 3.94 | 3.93 | 3.94 |
| | Pt(111) | 3.89 | | | |
| O | 1 (sub50% Co) | 1.74 | 1.74 | 2.13 | 2.06 |
| | 1 (sub25% Co) | 1.69 | 1.98 | 1.69 | 1.69 |
| | 2 | 1.55 | 1.47 | 1.55 | 1.55 |
| | 3 | 1.47 | 1.44 | 1.47 | 1.47 |
| | 4 | 1.43 | 1.47 | 1.43 | 1.43 |
| | Pt(111) | 1.25 | | | |
| OH | 1 (sub50% Co) | 1.06 | 1.04 | 1.11 | 1.12 |
| | 1 (sub25% Co) | 1.06 | 1.07 | 1.06 | 1.01 |
| | 2 | 0.96 | 0.96 | 0.95 | 0.99 |
| | 3 | 0.93 | 0.92 | 0.92 | 0.95 |
| | 4 | 0.92 | 0.92 | 0.92 | 0.93 |
| | Pt(111) | 0.86 | | | |

Although the present disclosure has been described with respect to one or more particular embodiments and/or examples, it will be understood that other embodiments and/or examples of the present disclosure may be made without departing from the scope of the present disclosure.

The invention claimed is:

1. A core-shell nanoparticle having a solid core comprising a first metal, wherein the first metal takes the form of a non-precious metal with carbon monoxide adsorbates disposed on a surface of the solid core, and a shell comprising a second metal disposed on at least portion of an exterior surface or all of the exterior surface of the core, wherein the second metal takes the form of a precious metal or semi-precious metal.

2. The core-shell nanoparticle of claim 1, wherein the first metal is a non-precious transition metal.

3. The core-shell nanoparticle of claim 2, wherein the first metal is cobalt.

4. The core-shell nanoparticle of claim 1, wherein the second metal is platinum, palladium, iridium, rhodium, or ruthenium.

5. The core-shell nanoparticle of claim 1, wherein the shell further comprises a third metal selected from nickel, iron, palladium, or combinations thereof.

6. The core-shell nanoparticle of claim 5, wherein the third metal is an alloy.

7. The core-shell nanoparticle of claim 6, wherein the third metal is a platinum-nickel, platinum-iron, palladium-nickel, palladium-iron, platinum-palladium, or platinum-palladium-nickel alloy.

8. The core-shell nanoparticle of claim 1, wherein the nanoparticle has a longest dimension of 7 nm to 12 nm.

9. The core-shell nanoparticle of claim 1, wherein the core has a longest dimension of 3 nm to 10 nm.

10. The core-shell nanoparticle of claim 1, wherein the shell thickness is 0.5 nm to 2 nm.

11. The core-shell nanoparticle of claim 1, wherein the core and/or shell is spherical.

12. The core-shell nanoparticle of claim 1, wherein the core and/or shell is polycrystalline.

13. The core-shell nanoparticle of claim 1, wherein the core and/or shell is a core having disordered polycrystalline domains and/or shell having (111) surfaces.

14. The core-shell nanoparticle of claim 1, wherein the nanoparticle enhances catalytic efficiency of a reaction.

15. The core-shell nanoparticle of claim 14, wherein the reaction is an oxygen reduction reaction.

16. A composition comprising one or more nanoparticles of claim 1 disposed on at least a portion of a substrate.

17. The composition of claim 16, wherein the one or more nanoparticles are disposed on at least a portion of an exterior surface of the substrate.

18. The composition of claim 16, wherein the substrate comprises a carbon material.

19. The composition of claim 18, wherein the carbon material is selected from carbon black or glassy carbon.

20. The composition of claim 16, wherein the one or more nanoparticles are disposed in a polymer.

21. The composition of claim 20, wherein the polymer is an ionomer.

22. The composition of claim 21, where the ionomer is a sulfonated tetrafluoroethylene based fluoropolymer-copolymer.

23. The composition of claim 16, wherein a precious metal loading is 10% by weight.

24. A method of making a core-shell nanoparticle of claim 1 comprising:
  a) providing a first metal precursor compound comprising one or more carbonyl ligand in a solvent to form a reaction mixture;
  b) heating the reaction mixture from a), wherein nanoparticles comprising a first metal are formed;
  c) adding a second metal precursor compound to the reaction mixture from b), wherein a shell comprising a second metal is formed on the nanoparticles comprising the first metal are formed.

25. The method of claim 24, wherein the one or more carbonyl ligand is a transition metal carbonyl compound.

26. The method of claim 24, wherein the reaction mixture is heated to 140-180° C.

27. The method of claim 24, wherein the second metal precursor compound is a precious metal or semi-precious metal coordination compound or precious metal or semi-precious metal organometallic compound.

28. The method of claim 24, wherein the second metal precursor is dissolved in a solvent.

29. The method of claim 28, wherein the solvent is oleylamine and/or dichorobenzene.

30. A method of catalyzing an oxygen reduction reaction comprising:
  contacting an electrode comprising one or more nanoparticles of claim 1 disposed on at least a portion of an exterior surface of the electrode that is in contact with an electrolyte, with oxygen,
  providing or applying a current to the electrode,
wherein anionic oxygen species and/or oxygen species are formed by one or more oxygen reduction reaction.

31. The method of claim 30, wherein the electrode is a cathode.

32. The method of claim 30, wherein the electrolyte is an alkaline or acidic medium.

33. The method of claim 30, wherein the anionic oxygen species and/or oxygen species is $H_2O$, $OH^-$, $O^{2--}$, or a combination thereof.

34. The method of claim 30, wherein the method further comprises:
  providing a negative electrode having at least a portion of an exterior surface of the electrode that is in contact with an electrolyte with hydrogen,
wherein hydrogen ions are produced and current generated at the negative electrode.

35. The method of claim 34, wherein the electrode comprising one or more nanoparticles and the negative electrode are separated by a polymer.

36. The method of claim 35, wherein the negative electrode is physically and/or electrically separated.

37. The method of claim 35, wherein the polymer is an ionomer.

38. The method of claim 37, wherein the ionomer is a sulfonated tetrafluoroethylene-based fluoropolymer-copolymer.

39. The method of claim 30, wherein the electrode is a cathode of an electrochemical cell or fuel cell.

40. The method of claim 39, wherein the fuel cell is a polymer electrolyte membrane fuel cell.

41. A device comprising an electrode having one or more nanoparticles of claim 1 disposed on at least a portion of an exterior surface of the electrode.

42. The device of claim 41, wherein the electrode is a cathode.

43. The device of claim 41, wherein the device is an electrochemical cell, electrolyzer, or fuel cell and the electrode is an electrode of the electrochemical cell, electrolyzer, or fuel cell.

44. The device of claim 43, wherein the fuel cell is a polymer electrolyte membrane fuel cell.

* * * * *